United States Patent
Kotaka et al.

(10) Patent No.: US 6,647,777 B1
(45) Date of Patent: *Nov. 18, 2003

(54) FLOW RATE SENSOR, FLOW METER, AND DISCHARGE RATE CONTROL APPARATUS FOR LIQUID DISCHARGE MACHINES

(75) Inventors: Hirofumi Kotaka, Chiba (JP); Atsushi Koike, Saitama (JP); Kiyoshi Yamagishi, Saitama (JP); Toshiaki Kawanishi, Saitama (JP); Kenji Tomonari, Saitama (JP); Shinichi Inoue, Saitama (JP); Yukihiro Tochio, Saitama (JP); Hiromitsu Miyajima, Aichi (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/529,594

(22) PCT Filed: Oct. 14, 1998

(86) PCT No.: PCT/JP98/04633

§ 371 (c)(1),
(2), (4) Date: Apr. 13, 2000

(87) PCT Pub. No.: WO99/19694

PCT Pub. Date: Apr. 22, 1999

(30) Foreign Application Priority Data

| Oct. 15, 1997 | (JP) | 9/281626 |
| Oct. 15, 1997 | (JP) | 9/281627 |
| Oct. 23, 1997 | (JP) | 9/291048 |
| Apr. 15, 1998 | (JP) | 10/104761 |
| Jun. 12, 1998 | (JP) | 10/165618 |

(51) Int. Cl.[7] ............................................. G01F 1/68
(52) U.S. Cl. ................................................. 73/204.26
(58) Field of Search .......................... 73/204.12, 204.15, 73/204.21, 204.22, 202.5, 866.5

(56) References Cited

U.S. PATENT DOCUMENTS

| 4,448,070 A |   | 5/1984 | Ohyama et al. ............... 73/204 |
| 4,770,037 A | * | 9/1988 | Noir et al. ..................... 73/204 |

FOREIGN PATENT DOCUMENTS

| JP | 57-173758 | 10/1982 |
| JP | 2-238218  | 9/1990  |
| JP | 6-42746   | 2/1994  |

(List continued on next page.)

*Primary Examiner*—Edward Lefkowitz
*Assistant Examiner*—C. Dickens
(74) *Attorney, Agent, or Firm*—Baker & Daniels

(57) ABSTRACT

A pipe line for fluid to be detected is formed so that heat from a flow rate detector in which a thin-film heating element and a thin-film temperature sensing element are laminated on a first surface of a substrate through an insulating layer is transferred to and absorbed by the fluid. In the flow rate detector, the temperature sensing which is affected by the heat absorption of the fluid due to the heating of the thin-film heating element is executed by the thin-film temperature sensing element, and the flow rate of the fluid in the pipe line is detected on the basis of the temperature sensing result. A fin plate extending into the pipe line is joined to a second surface of the substrate of the flow rate detector by a joint member, and the fin plate extends so as to pass through the central portion on the circular section of the pipe line. The dimension of the fin plate in the direction of the pipe line is larger than the dimension $L_2$ of the thickness. Accordingly, even when the fluid is viscous fluid having relatively high viscosity, and further even when the flow rate is relatively small or under a broad environmental temperature condition, the flow rate of the fluid-flowing in the pipe line can be accurately measured.

55 Claims, 21 Drawing Sheets

FOREIGN PATENT DOCUMENTS

| | | |
|---|---|---|
| JP | 06-306897 | 11/1994 |
| JP | 06-341880 | 12/1994 |
| JP | 7-324728 | 12/1995 |
| JP | 08-146026 | 6/1996 |
| JP | 8-240468 | 9/1996 |
| JP | 8-240469 | 9/1996 |
| JP | 09-068447 | 3/1997 |
| JP | 09-256920 | 9/1997 |

* cited by examiner

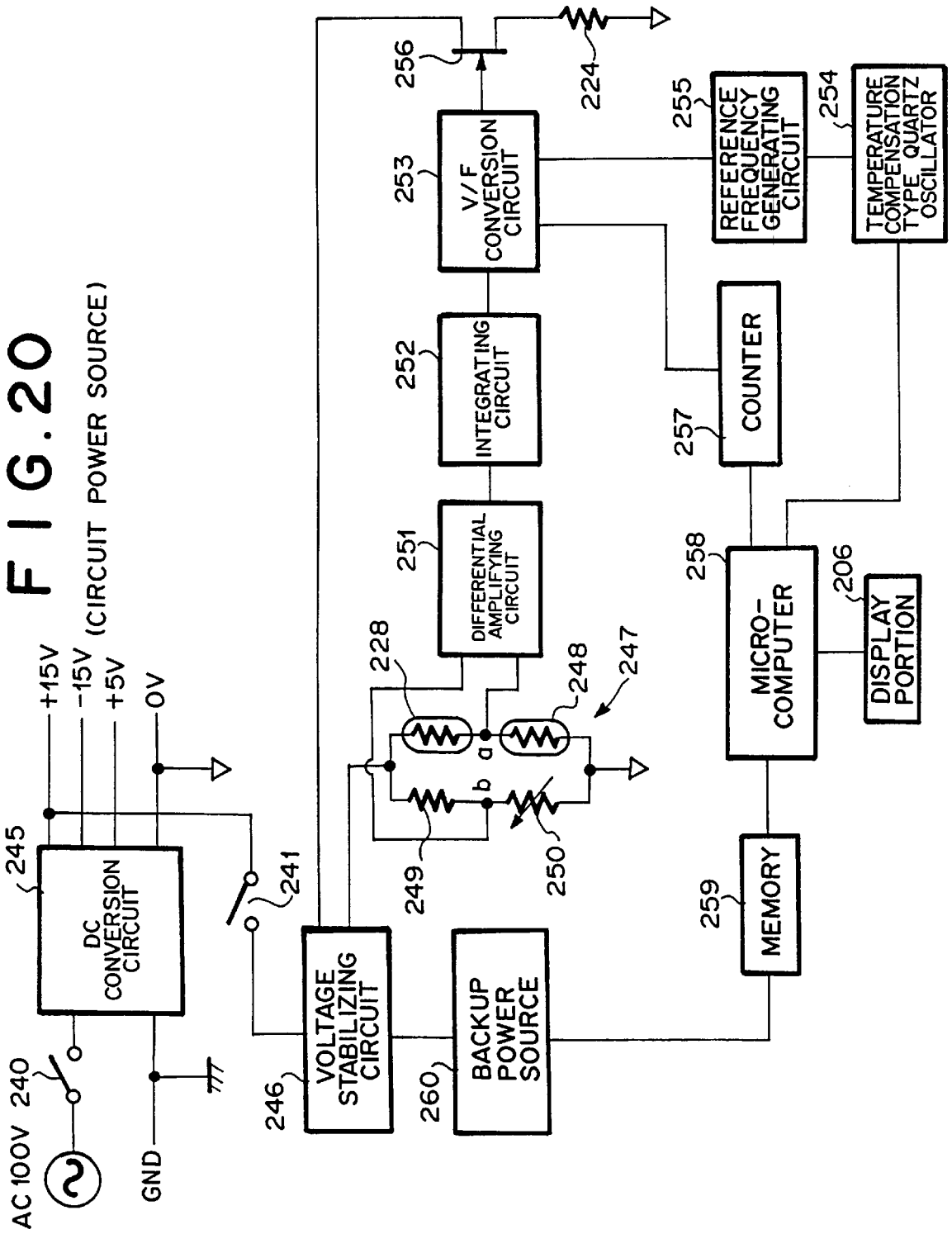

F I G. 28
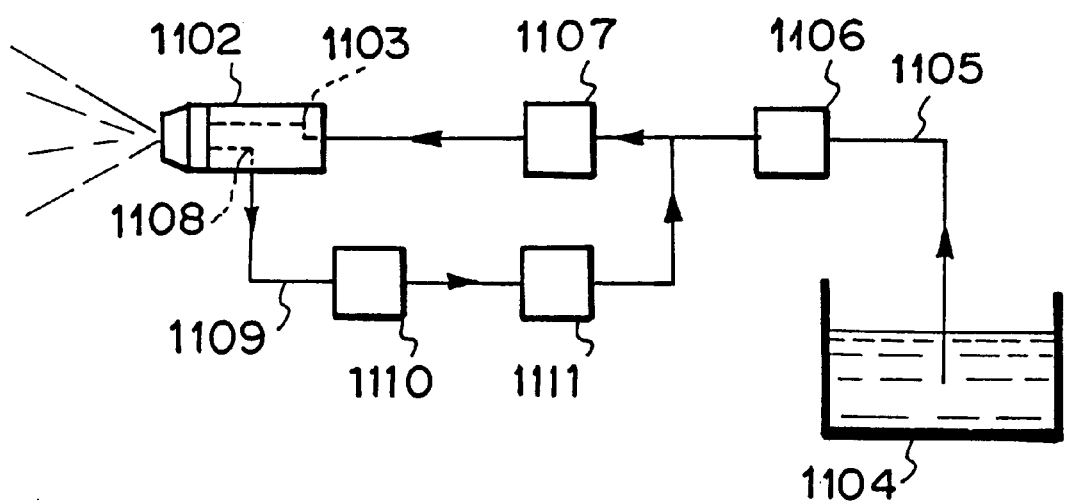

FLOW RATE SENSOR, FLOW METER, AND DISCHARGE RATE CONTROL APPARATUS FOR LIQUID DISCHARGE MACHINES

TECHNICAL FIELD

The present invention belongs to a fluid flow rate detection technology, and particularly relates to a flow rate sensor, particularly a thermal type flow rate sensor for detecting the flow rate of fluid flowing in a pipe line. The flow rate sensor of the present invention is suitably used to accurately measure the flow rate of fluid having relatively high viscosity and also suitably used for the measurement of flow rate of inflammable fluid for which abnormal temperature increase is required to be avoided.

Further, the present invention belongs to a fluid flow rate detection technology, and particularly relates to a flowmeter for measuring the instantaneous flow rate and the integrated flow rate of fluid flowing in a pipe line.

Still further, the present invention relates to a portable flowmeter which can be mounted on a pipe line through which kerosene is supplied to a kerosene burning device such as a stove, boiler or the like to measure the flow rate of kerosene, and also easily portably carried.

Still further, the present invention belongs to a liquid discharge amount control technology field, and particularly relates to a discharge amount control apparatus for liquid discharging equipment. The apparatus of the present invention is suitably used to control a sprayed (atomized) fuel oil discharging amount of an oil burner for burning fuel oil and produce desired heating power.

BACKGROUND TECHNIQUE

Various types of sensors have been hitherto used as a flow rate sensor (or flow velocity sensor) for measuring the flow rate (or flow velocity) of various fluid, particularly liquid, and a so-called thermal (particularly indirectly heated type) flow rate sensor is used because the cost can be easily reduced.

A sensor in which a thin-film heating element and a thin-film temperature sensing element are laminated through an insulating layer on a substrate and the substrate is secured to a pipe line is used as an indirectly heated type flow rate sensor. By passing current through the heating element, the temperature sensing element is heated to vary the electrical characteristic of the temperature sensing element such as the value of the electrical resistance of the temperature sensing element. The electrical resistance value (varied on the basis of the temperature increase of the temperature sensing element) is varied in accordance with the flow rate (flow velocity) of fluid flowing in the pipe line. This is because a part of the heating value of the heating element is transferred through the substrate into the fluid, the heating value diffusing into the fluid is varied in accordance with the flow rate (flow velocity) of the fluid, and the heating value to be supplied to the temperature sensing element is varied in accordance with the variation of the heating value diffusing into the fluid, so that the electrical resistance value of the temperature sensing element is varied. The variation of the electrical resistance value of the temperature sensing element is also varied in accordance with the temperature of the fluid. Therefore, a temperature sensing device for temperature compensation is installed in an electrical circuit for measuring the variation of the electrical resistance value of the temperature sensing element to suppress the variation of the flow-rate measurement value due to the temperature of the fluid at maximum.

An indirectly heated type flow rate sensor using thin film elements as described above is disclosed in JP-08-146026 (A), for example.

The conventional indirectly heated type flow rate sensor is secured to a linear pipe line portion, and also the substrate of a flow rate detector or a casing which is thermally connected to the substrate is exposed from the wall surface of the pipe line to the fluid.

When the fluid is viscous fluid, particularly viscous fluid having relatively high viscosity, the flow-velocity distribution on the section perpendicular to the flow of the fluid in the pipe line is more remarkable (there is a great difference in flow velocity between the center portion and the outer peripheral portion on the section). In the case of the conventional sensor in which the substrate or the casing portion connected to the substrate is merely exposed to the fluid at the wall of the pipe line, the flow-velocity distribution has a great effect on the precision of the flow-rate measurement. This is because the flow velocity of the fluid flowing at the center portion on the section of the pipe line is not taken into consideration, but only the flow velocity of the fluid in the neighborhood of the wall of the pipe line is taken into consideration. As described above, the conventional flow rate sensor has such a problem that it is difficult to measure the flow rate of fluid accurately when the fluid is viscous fluid having relatively high viscosity.

Even when fluid has low viscosity at room temperature, it induces a problem connected to the above viscosity problem because the viscosity of the fluid increases as the temperature is lowered.

Further, the above problem is more remarkable when the flow rate per unit time is relatively low than when the flow rate per unit time is high.

The flow rate sensor is required to be used under an extremely broad temperature environment in accordance with a geographical condition, an indoor or outdoor condition, etc. Further, these conditions are added with a season condition, a day or night condition, etc., and the temperature environment is greatly varied. Therefore, there has been required a flow rate sensor which can detect the flow rate accurately under such a broad environmental temperature condition as described above.

Therefore, an object of the present invention is to provide a flow rate sensor which can accurately measure the flow rate of fluid flowing in a pipe line even when the fluid is viscous fluid having relatively high viscosity.

Further, an object of the present invention is to provide a flow rate sensor which can accurately measure the flow rate of fluid flowing in a pipe line even when the flow rate is relatively small.

Still further, an object of the present invention is to provide a flow rate sensor which can accurately measure the flow rate of fluid flowing in a pipe line under a broad environmental temperature condition.

In the conventional indirectly heated type flow rate sensor, a constant voltage is applied to the heating element to obtain a desired heating value. A part of the heating value is endothermically transferred to the fluid and the remaining part of the heating value is transferred to the temperature sensing element. Therefore, the surrounding temperature of the heating element is varied in accordance with the flow rate of the fluid. When the flow rate of the fluid is high, the temperature increase is small. On the other hand, when the flow rate of the fluid is low, the temperature increase is large.

The problem occurs when fluid, particularly liquid is extinguished for some cause. In this case, the endothermic action of the fluid is lost, so that the temperature of the temperature sensing element is sharply increased, resulting in deterioration of the flow rate sensor with time lapse.

In the case where the fluid is kerosene or other inflammable and volatile fluid, the fluid is vaporized if the fluid is supplied when the sharp temperature increase as described above arises or after the sharp temperature increase, and then if air is mixed with the fluid, ignition and explosion may occur.

Therefore, an object of the present invention is to prevent excessive increase of the surrounding (environmental) temperature of the heating element of the thermal flow rate sensor, thereby preventing the deterioration of the flow rate sensor with time elapse and the ignition and explosion of inflammable fluid to be detected.

Further, when fuel fluid such as kerosene or fuel gas is supplied to demanders, the flow rate (instantaneous flow rate) of fuel fluid to be supplied to each demander is measured and integrated to determine an integrated flow rate, and then the rate corresponding to the integrated flow rate is charged to the demander on the basis of the measurement result.

Various types of instruments are used as equipment for burning and consuming the fuel fluid at each demander side (for example, at general home), and the fuel consumption amount (flow rate per unit time) is generally different among these instruments. For example, a kerosene fan heater is used at a flow rate which is not so high (for example, 40 cc/hour), whereas a kerosene hot water supplier is used at a flow rate which is high (for example, 6,000 cc/hour).

As described above, the range of the flow rate at which the fuel fluid is supplied has been extremely broad at present, and also the precision required to flowmeters has also severer. That is, if the precision of the flow-rate measurement is within an error of 1%, the measurement error is equal to 60 cc/hour at maximum in the case of the kerosene hot water supplier, which means that it is insignificant to measure the flow rate of 40 cc/hour of the kerosene fan heater. Accordingly, in such a fuel fluid supply system, a severer precision at which the error is within 0.01% in the flow rate range from 10 cc/hour to 20,000 cc/hour has been required.

In order to support the required severe precision over the broad flow rate range as described above, there has been proposed a flowmeter in which the flow rate range is divided into plural flow rate areas, a flow passage for a low flow-rate area and a flow passage for a high flow-rate area are separately provided and flow rate sensors are separately disposed in the respective flow passages (see JP-08-240468 (A) and JP-08-240469(A)).

However, such a flowmeter has a disadvantage that the structure of the measurement portion is complicated and large-scaled, resulting in increase of the frequency of occurrence of troubles, and further the number of flow rate sensors is increased.

Further, JP-02-238218(A) proposes an oil server which displays a kerosene integrated flow rate in a broad flow-rate area with high precision. However, this oil server has also the same disadvantage that the structure of the measurement portion is complicated and thus the frequency of occurrence of troubles is increased.

Therefore, the present invention has an object to provide a flowmeter which can measure the flow rate over a broad flow-rate range with high precision without complicating the structure of the measurement portion, with lowering the frequency of occurrence of troubles of the measurement portion and without increasing the number of flow rate sensors.

Further, a kerosene burning apparatus such as a stove, boiler or the like burns kerosene and produces heat to increase the temperature of air and heat the inside of a room, to heat and boil a large amount of water and to produce high-pressure steam serving as a driving source.

In a boiler 301 shown in FIGS. 26, 27A and 27B, kerosene is supplied from a tank 302 through a pipe line 303, and then burned by a burner 304 while sprayed. By using heat produced at this time, a large amount of water is boiled or high-pressure steam is produced, and the combustion gas is discharged from a funnel 305.

Further, a strainer 307 for removing foreign matter such as dust, motes, etc. is disposed between the tank 302 and the pump 306, and a flowmeter 308 for measuring the flow rate of kerosene is disposed between the pump 306 and the burner 304.

However, when minute foreign matters passing through the strainer 307 are gradually accumulated or foreign matters invade between the strainer 307 and the burner 304, these foreign matters cannot be removed and the foreign matters invade into the nozzle 309 of the burner 304, thereby closing a part of the discharge port 309a.

In such a case, the amount of kerosene passing through the nozzle 309 is reduced and thus the burner 304 cannot exhibit its sufficient performance, resulting in reduction of the heat value produced in the boiler 301. Further, since kerosene is incompletely burned (combusted), the energy held by the kerosene is vainly dissipated to produce incomplete combustion gas such as carbon monoxide or the like, which causes air pollution.

In order to solve the above problem, there has been proposed an air fuel ratio control method for measuring the flow rate of kerosene flowing in a pipe line 303 with a flowmeter 308 disposed in the pipe line and supplying a suitably amount of air corresponding to the measurement value to burn kerosene.

According to this method, even when a part of the discharge port 309a of the nozzle 309 is closed, no incomplete combustion occurs and thus the vain consumption of the holding energy of kerosene and the air pollution due to the incomplete combustion can be prevented. If the foreign matters in the nozzle 309 is jetted from the discharged port 309a under jetting pressure of kerosene or the like, the burner 304 can exhibits its inherent performance and the heating value of the boiler 301 is restored to its normal value.

According to this method, the incomplete combustion can be prevented, however, the reduction of the heating value produced in the boiler 301 cannot be prevented. Further, if foreign matters in the nozzle 309 are not discharged from the discharge port 309a, they must be artificially removed.

The present invention has been implemented to solve the above problems, and has an object to provide a portable flowmeter which can be readily mounted on a pipe line for supplying kerosene to a kerosene burning apparatus, can measure the flow rate of kerosene instantaneously, is simple in construction and light in weight, and also can be easily carried by a worker.

Further, in a conventional burning apparatus such as an oil burner for producing flames by spraying and discharging fuel oil and then igniting the fuel oil, a discharge amount of fuel oil which is sprayed and discharged from an oil burner is controlled to obtain desired heating power. The control of the discharge amount is carried out by controlling the flow rate of the fuel oil in the pipe line (conduit line) and controlling the supply amount of the fuel oil to the oil burner.

For example, as shown in FIG. 28, a fuel oil supply pipe line 1105 connected to a fuel oil tank 1104 is connected to a fuel oil supply path 1103 of a return type nozzle 1102, and a strainer 1106 and a fixed displacement pump 1107 are disposed in this order from the fuel oil tank 1104 side in the fuel oil supply pipe line 1105. A fuel oil return pipe 1109 to be connected between the strainer 1106 and the fixed displacement pump 1107 is connected to a fuel oil return path 1108 of the return type nozzle 1102, and a flow-rate adjusting valve 1110 and a check valve 1111 are disposed in this order from the return type nozzle 1102 side in the fuel oil return pipe 1109.

In this apparatus, the fixed displacement pump 1107 is actuated to supply a desired amount of fuel oil in the fuel tank 1104 through the strainer 1106 to the nozzle 1102, and the desired amount of fuel oil thus supplied is sprayed and discharged from the nozzle 1102 while the flow amount thereof is controlled by the flow-rate adjusting valve 1110 of the fuel oil return pipe 1109. The surplus fuel oil is returned through the fuel oil return pipe 1109.

In order to further enhance the precision for the control of the fuel oil discharge amount in the apparatus, the following improvements have been recently made.

For example, JP-07-324728(A) discloses that in order to enable supply of a minute amount of fuel oil which has been difficult to be performed by the adjustment operation of only the flow-rate adjusting valve 1110, the fixed displacement pump 1107 is replaced by a pressure-variable pump, the supply pressure of fuel oil is set to a high value, and the sprayed discharge amount of the fuel oil in the range from a low sprayed discharge amount area to a high sprayed discharge amount area, that is, the supply amount of the fuel oil to the nozzle is controlled in combination of a throttle control operation of the flow-rate adjusting valve 1110.

Further, JP-06-42746(A) discloses that the flow-rate adjusting valve 1110 is replaced by an oil electromagnetic valve controlled by a controller, the fixed displacement pump 1107 is replaced by a fixed differential pressure pump controlled by a controller, a discharge amount variable pump controlled by a controller is disposed between the connection portion of the fuel oil return pipe 1109 and the fuel oil tank 1104, and an oil amount sensor is secured to the fuel oil supply pipe line 1105 at one of the suction side and the discharge side of the discharge amount variable pump. According to this publication, the suction/discharge amount of the discharge amount variable pump is detected on the assumption that the amount of oil discharged from the return type nozzle 1102 is equal to the amount of oil sucked/discharged by the discharge amount variable pump under a stable state, and the output value to the discharge amount variable pump is corrected on the basis of the difference between the above detection value and a desired flow-rate amount calculated by the controller, thereby obtaining a desired oil discharge amount.

However, in both the above prior arts, the discharge amount is not controlled by detecting the discharge amount of the fuel oil which is actually discharged from the nozzle, so that it is difficult to quickly obtain a proper discharge amount when there occurs a trouble such as cavitation of the pump or a little clogging at the strainer, and the discharge amount control is still susceptible to improvements.

That is, when the control of the fuel oil discharge amount cannot be performed with high precision, the performance of the burner cannot be exhibited at maximum, so that a desired excellent burning state cannot be implemented. Therefore, an energy-resource wasting problem due to incomplete combustion and an air pollution problem due to incomplete combustion exhaust gas arise.

Particularly when the fuel oil supply amount is small, the effect of these problems is greater because the variation rate is increased.

As described above, there is not any flow-rate sensor which can accurately detect even a minute flow rate of liquid with quick response, and this is also a factor which makes it difficult to accurately control the discharge amount of liquid such as fuel oil or the like.

Therefore, an object of the present invention is to provide a liquid discharge amount control apparatus which can detect the amount of liquid actually discharged from liquid discharge equipment such as various types of nozzles as accurately as possible, and easily obtain a desired discharge amount on the basis of the detection result.

Further, another object of the present invention is to provide a liquid discharge amount control apparatus which can detect the flow rate accurately with high responsibility through the above discharge control operation even when the liquid is viscous fluid having relatively high viscosity or the discharge amount is relatively small, or under a broad environmental temperature condition, thereby performing feedback control with high reliability and achieving a desired discharge amount.

SUMMARY OF THE INVENTION

In order to attain the above object, according to the present invention, there is provided a flow rate sensor including a flow rate detector having a heating function and a temperature sensing function, and a pipe line for fluid to be detected which is formed so that heat from the flow rate detector is transferred to and absorbed by the fluid to be detected, wherein the temperature sensing which is affected by a heat absorption effect of the fluid to be detected due to the heat is executed in the flow rate detector, and the flow rate of the fluid to be detected in the pipe line is detected on the basis of the temperature sensing result, characterized in that a heat transfer member extending into the inside of the pipe line is provided to the flow rate detector, and the heat transfer member is formed so as to extend to at least the vicinity of the central portion on the section of the pipe line.

According to an embodiment of the present invention, the flow rate detector is constructed by forming on a substrate a thin-film heating element and a flow rate detecting thin-film temperature sensing element disposed so as to suffer the effect of the heating of the thin-film heating element.

According to an embodiment of the present invention, the heat transfer member is joined to the substrate.

According to an embodiment of the present invention, the thin-film heating element and the flow rate detection thin-film temperature sensing element are laminated on a first surface of the substrate through an insulating layer.

According to an embodiment of the present invention, the heat transfer member is joined to a second surface of the substrate.

According to an embodiment of the present invention, the dimension of the heat transfer member in the direction of the pipe line is set to be larger than the dimension in the direction perpendicular to the extension direction of the heat transfer member within the section of the pipe line.

According to an embodiment of the present invention, the pipe line is bent at a portion where the heat transfer member extends.

According to the present invention, there is provided a flow rate sensor including a flow rate detector having a heating function and a temperature sensing function, and a pipe line for fluid to be detected which is formed so that heat from the flow rate detector is transferred to and absorbed by the fluid to be detected, wherein the temperature sensing which is affected a heat absorption effect of the fluid to be detected due to the heat is executed in the flow rate detector, and the flow rate of the fluid to be detected in the pipe line is detected on the basis of the temperature sensing result, characterized in that the pipe line has a bent portion, and the flow rate detector is located on a wall at the fluid flow-out side of the pipe line which is located so as to traverse the travel direction of the fluid flowing from the fluid flow-in side of the bent portion of the pipe line.

According to an embodiment of the present invention, the flow rate detector is constructed by laminating a thin-film heating element and a flow rate detection thin-film temperature sensing element on a first surface of a substrate through an insulating layer, and joining a second surface of the substrate to the wall at the fluid flow-out side of the bent portion.

In the above invention, when the flow rate of the fluid to be detected in the pipe line is detected, a temperature detector for detecting the temperature of the fluid to be detected in the pipe line for compensation can be provided. The temperature detector preferably has the same temperature sensing function as the flow rate detector.

According to the present invention, in order to attain the above object, there is provided a flow rate sensor including a heating element and a flow rate detection temperature sensing element disposed so as to suffer an effect of heating of the heating element, wherein a flow passage for fluid to be detected is formed so that the heat from the heating element is transferred to and absorbed by the fluid to be detected, the temperature sensing which is affected by an effect of heat absorption of the fluid to be detected due to the heating of the heating element is executed in the flow rate detection temperature sensing element, heating control means for controlling the heating of the heating element is connected to a passage for supplying power to the heating element, the heating control means controls the power to be supplied to the heating element on the basis of the temperature sensing result so that the temperature sensing result is coincident with a target value, and the flow rate of the fluid to be detected is detected on the basis of the control state of the heating control means.

In an embodiment of the invention, a bridge circuit is formed by using the flow rate detection temperature sensing element, and an output indicating the temperature sensing result is obtained from the bridge circuit, and the heating control means is controlled on the basis of the output.

In an embodiment of the invention, the bridge circuit contains a temperature compensating temperature sensing element for compensating the temperature of the fluid to be detected.

In an embodiment of the invention, the heating control means is a variable resistor.

In an embodiment of the invention, a transistor is used as the variable resistor, and a signal based on the output indicating the temperature sensing result is used for the control input of the transistor.

In an embodiment of the invention, a voltage to be applied to the heating element is used as a thing for indicating the control state of the heating control means.

In an embodiment of the invention, the output indicating the temperature sensing result is input to the heating control means through response setting means.

In an embodiment of the invention, the responsibility setting means contains a differential amplifying circuit and an integrating circuit to which the output of the differential amplifying circuit is input.

In an embodiment of the invention, the output indicating the temperature sensing result is input to the heating control means through an integrating circuit.

In an embodiment of the invention, the differential amplifying circuit is connected to the pre-stage of the integrating circuit.

In an embodiment of the invention, each of the heating element and the flow rate detection temperature sensing element is formed of a thin film, and the heating element and the flow rate detection temperature sensing element are laminated on a substrate through an insulating layer.

According to the present invention, in order to attain the above object, there is provided a flowmeter including a heating element and a flow rate detection temperature sensing element disposed so as to be affected by an effect of heating of the heating element, wherein a flow passage for fluid to be detected is formed so that the heat from the heating element is transferred to and absorbed by fluid to be detected, the temperature sensing which is affected by an effect of heat absorption of the fluid to be detected due to the heating of the heating element is executed in the flow rate detection temperature sensing element, heating control means for controlling the heating of the heating element is connected to a passage for supplying power to the heating element, the heating control means controls the power to be supplied to the heating element so that the temperature sensing result is coincident with a target value, the heating control means performs ON-OFF control of the power to be supplied to the heating element on the basis of a pulse signal having the frequency corresponding to the temperature sensing result, and the flow rate of the fluid to be detected is detected by measuring the frequency of the pulse signal.

In an embodiment of the invention, a bridge circuit is formed by using the flow rate detection temperature sensing element, an output indicating the temperature sensing result is obtained from the bridge circuit, the output is processed by a differentially amplifying circuit and an integrating circuit to obtain a voltage signal, and the voltage signal thus obtained is subjected to voltage-frequency conversion to obtain the pulse signal.

In an embodiment of the invention, switching means is interposed in a passage for supplying power to the heating element, and the heating control means performs the ON-OFF control by opening/closing the switching means.

In an embodiment of the invention, a plurality of power supply passages to the heating element are provided, each power supply passage is supplied with a voltage which is different among the power supply passages, switching means is interposed in each power supply passage, and the heating control means selects one of the plural power supply passages to open/close the switching means thereof, thereby performing the ON-OFF control.

In an embodiment of the invention, when the frequency of the pulse signal arrives at the lower limit set value, the heating control means selects a power supply passage to which a lower voltage is applied, and when the frequency of the pulse signal arrives at the upper limit set value, the heating control means selects a power supply passage to which a higher voltage is applied.

In an embodiment of the invention, the selection of the power supply passage is performed by detecting a voltage signal which is obtained by processing the output indicating the temperature sensing result obtained from a bridge circuit formed with the flow rate detection temperature sensing element with use of a differential amplifying circuit and an integrating circuit.

In an embodiment of the invention, the switching means is a field effect transistor.

In an embodiment of the invention, the bridge circuit contains a temperature sensing element for temperature compensation to compensate the temperature of the fluid to be detected.

In an embodiment of the invention, each of the heating element and the flow rate detection temperature sensing element is formed of thin film, and the heating element and the flow rate detection temperature sensing element are laminated on a substrate through an insulating layer.

Further, in order to attain the above object, according to the invention, a portable flowmeter is constructed by a casing comprising a body portion and a lid portion, the body portion having at both the end portions thereof connection portions to be connected to external pipes and containing a flow pipe line penetrating therethrough, a flow rate sensor which is accommodated in the casing and detects the flow rate of fluid, a display portion for displaying a flow rate value, an operating portion for power-supplying and measuring the flow rate, and an electrical circuit for displaying on the display portion the flow rate detected by the flow rate sensor.

In order to detect the flow rate with high sensitivity, the flow rate sensor includes a flow rate detector having a heating element and a temperature sensing element formed on a substrate, a fin plate for transferring heat to fluid to be detected therethrough, and an output terminal for outputting the voltage value corresponding to the flow rate. The flow rate detector, a part of the fin plate and a part of the output terminal are preferably coated by molding.

In order to reduce the error of the flow rate measurement value due to the temperature of kerosene, it is preferable that a temperature sensor for detecting the temperature of the fluid is further accommodated in the casing.

In order to perform the temperature detection with high sensitivity, it is preferable that the temperature sensor includes a temperature detection portion having a temperature sensing element formed on a substrate, a fin plate for transferring heat to the fluid to be detected therethrough, and an output terminal for outputting the voltage value corresponding to the temperature and that the temperature detection portion, a part of the fin plate and a part of the output terminal are coated by molding.

The display portion is disposed on the upper surface of the lid portion of the casing to digitally display the measurement value of the flow rate.

The operating portion may be disposed on the upper surface of the lid portion of the casing, and comprise a power source button and a measurement button.

When the electrical circuit is constructed by a bridge circuit containing the temperature sensing element of the flow rate sensor and the temperature sensing element of the temperature sensor and outputting the voltage difference corresponding to the flow rate of the fluid, a V/F conversion circuit for converting the voltage difference corresponding to the flow rate of the fluid to a pulse signal having the corresponding frequency, a counter for counting the pulse signal, and a microcomputer for converting the frequency to the corresponding flow rate, the measurement value of the flow rate can be digitally displayed on the display portion.

The portable flowmeter may be mounted on a bypass pipe line secured to the external pipe. Alternatively, it may be mounted on a self seal coupling secured to the external pipe. When the flowmeter is mounted on the self seal coupling, it is not necessary to dispose an open/close valve, and thus a mounting work is simple.

Further, according to the present invention, in order to attain the above object, there is provided a liquid discharge amount control apparatus for discharging a desired discharge amount of liquid from liquid discharge equipment for discharging to the outside the liquid supplied through a pipe line connected to a liquid supply source by a pump, characterized by comprising a flow rate sensor for detecting the flow rate of the liquid flowing in the pipe line between the pump and the liquid discharge equipment, flow rate adjusting means for adjusting the flow rate of the liquid in the pipe line at the upstream side of the flow rate sensor, and a controller for controlling the flow rate adjusting means so that the flow rate value detected by the flow rate sensor is equal to the value corresponding to the desired discharge amount.

In an embodiment of the invention, the flow rate adjusting means comprises a flow rate adjusting valve secured to the pipe line between the pump and the flow rate sensor and/or the pump which is designed so that the discharge amount thereof is variable.

In an embodiment of the invention, the liquid is inflammable liquid, and the liquid discharge equipment is a non-return type nozzle.

In an embodiment of the invention, the liquid is fuel oil, and the liquid discharge equipment is a non-return hydraulic oil burner.

In an embodiment of the invention, the pipe line contains a passage for returning the liquid from a just upstream position of the flow rate sensor to an upstream position of the pump, a check valve is interposed in the passage and the check valve passes the liquid therethrough when the pressure difference between both sides with respect to the check valve is equal to a predetermined value or more.

According to the invention, in order to attain the above object, there is provided a liquid discharge amount control apparatus for discharging a desired discharge amount of liquid from liquid discharge equipment for discharging to the outside a part of the liquid supplied through a pipe line connected to a liquid supply source by a pump and returning the other part of the liquid through a return pipe to the pipe line, characterized by comprising: a first flow rate sensor for detecting the flow rate of the liquid flowing in the pipe line between the pump and the liquid discharge equipment, a second flow rate sensor for detecting the flow rate of the liquid returned through the return pipe, flow rate adjusting means for adjusting the flow rate of the liquid flowing in the pipe line at the upstream side of the first flow rate sensor, and a controller for controlling the flow rate adjusting means so that the value obtained by subtracting a second flow rate value detected by the second flow rate sensor from a first flow rate value detected by the first flow rate sensor is equal to the value corresponding to the desired discharge amount.

In an embodiment of the invention, the flow rate adjusting means comprises a flow rate adjusting valve secured in a pipe line between the pump and the first flow rate sensor and/or the pump which is designed so that the discharge amount is variable.

In an embodiment of the invention, the liquid is formed of inflammable liquid, and the liquid discharge equipment is a return type nozzle.

In an embodiment of the invention, the liquid is fuel oil, and the liquid discharge equipment is a return type hydraulic oil burner.

In the invention as described above, as the flow rate sensor or the first flow rate sensor and the second flow rate sensor may be used one which is provided with a flow rate detector having a heating function and a temperature sensing function and is secured to the pipe line so that the heat from the flow rate detector is transferred to and absorbed by the liquid, the temperature sensing affected by the heat absorption of the liquid on the basis of the heating being executed in the flow rate detector to detect the flow rate of the liquid in the pipe line on the basis of the temperature sensing result, and in which a heat transfer member extending into the pipe line is secured to the flow rate detector, the heat transfer member extending to at least the vicinity of the central portion on the section of the pipe line.

In an embodiment of the invention, the flow rate detector is constructed by forming on a substrate a thin-film heating element and a flow-rate detection thin-film temperature sensing element disposed so as to be affected by the effect of the heating of the thin-film heating element.

In an embodiment of the invention, the heat transfer member is joined to the substrate.

In an embodiment of the invention, the thin-film heating element and the flow-rate detection thin-film temperature sensing element are laminated on a first surface of the substrate through an insulating layer.

In an embodiment of the invention, the heat transfer member is joined to a second surface of the substrate.

In an embodiment of the invention, the dimension of the heat transfer member in the direction of the pipe line is larger than the dimension in a direction perpendicular to the extending direction of the heat transfer member on the section of the pipe line.

In an embodiment of the invention, there is further provided a temperature detection portion for detecting the temperature of the liquid in the pipe line for compensation when the flow rate of the liquid in the pipe line is detected.

In an embodiment of the invention, the temperature detection portion has the same temperature sensing function as the flow rate detector.

In an embodiment of the invention, the pump is a displacement type pump.

BRIEF DESCRIPTION OF THE DRAWINGS

FIG. 20 is an electrical circuit diagram showing an embodiment of the portable flowmeter according to the present invention;

FIG. 28 is a schematic diagram showing a discharge amount control apparatus of a conventional liquid discharge equipment.

PREFERRED EMBODIMENTS FOR EXECUTING THE INVENTION

Embodiments of the present invention will be described with reference to the drawings.

Figure 1:
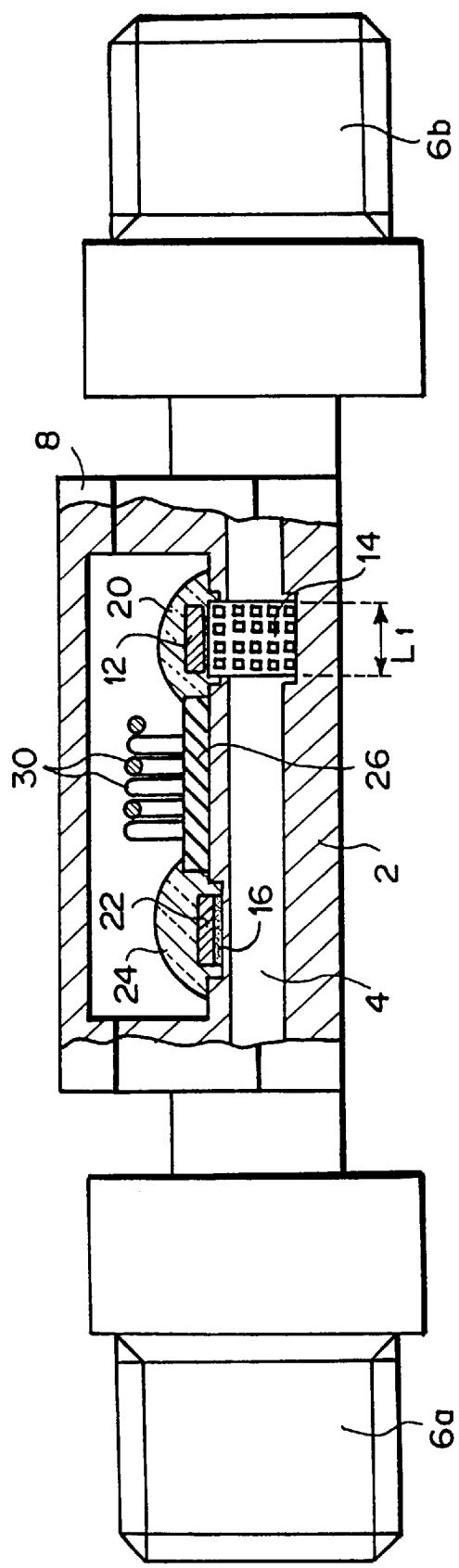
FIG. 1 is a partially cut-out side view showing an embodiment of a flow rate sensor according to the present invention.
Figure 2:
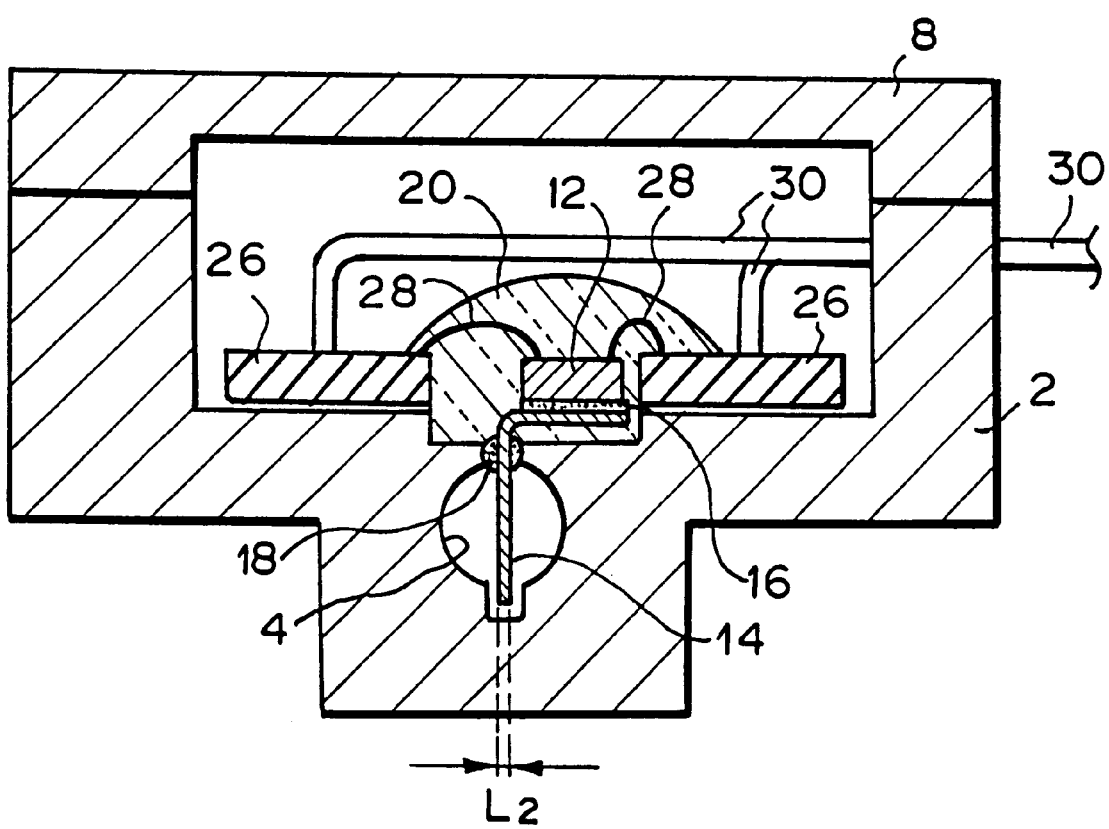
FIG. 2 is a cross-sectional view showing the embodiment of the flow rate sensor according to the present invention.
Figure 3:
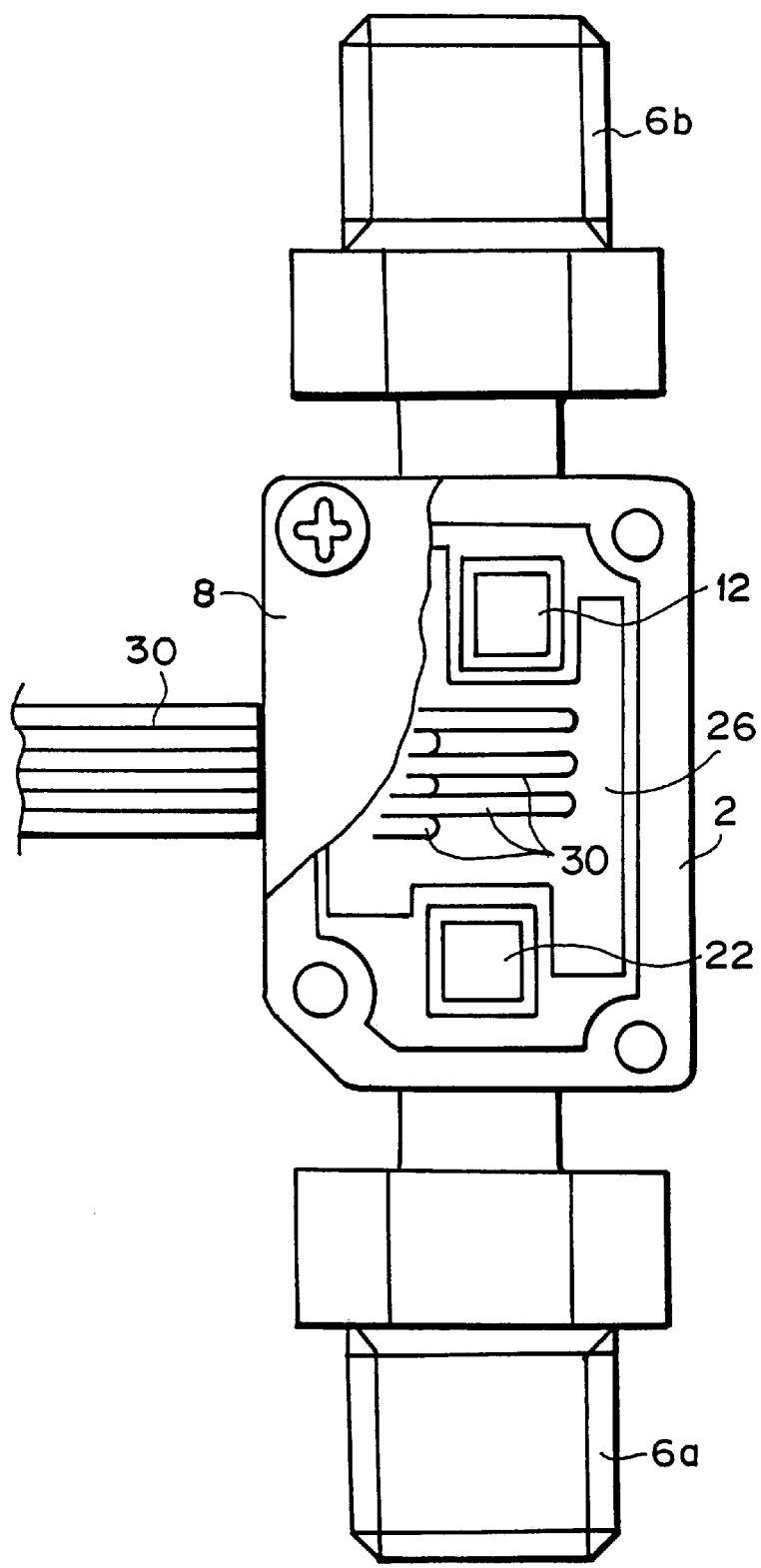
FIG. 3 is a partially cut-out plan view showing the embodiment of the flow rate sensor according to the present invention.

FIG. 3 is a partially cut-out plan view showing an embodiment of a flow rate sensor according to the present invention, and FIGS. 1 and 2 are partially cut-out side view and cross-sectional view of FIG. 3.

In these figures, 2 represents the main body portion of a casing, and a pipe line 4 serving as a flow passage for fluid to be detected is formed so as to penetrate through the casing main body portion. The pipe line 4 extends to both the ends of the casing main body portion 2. Connection portions 6a, 6b for connecting to an external pipe are formed at both ends of the casing main body portion. A device accommodating portion is formed at the upper side of the pipe line 4 in the casing 2, and a casing lid portion 8 is fixed to the accommodation portion by a screw. The casing is constructed by the casing lid portion 8 and the casing main body portion 2.

Figure 4:
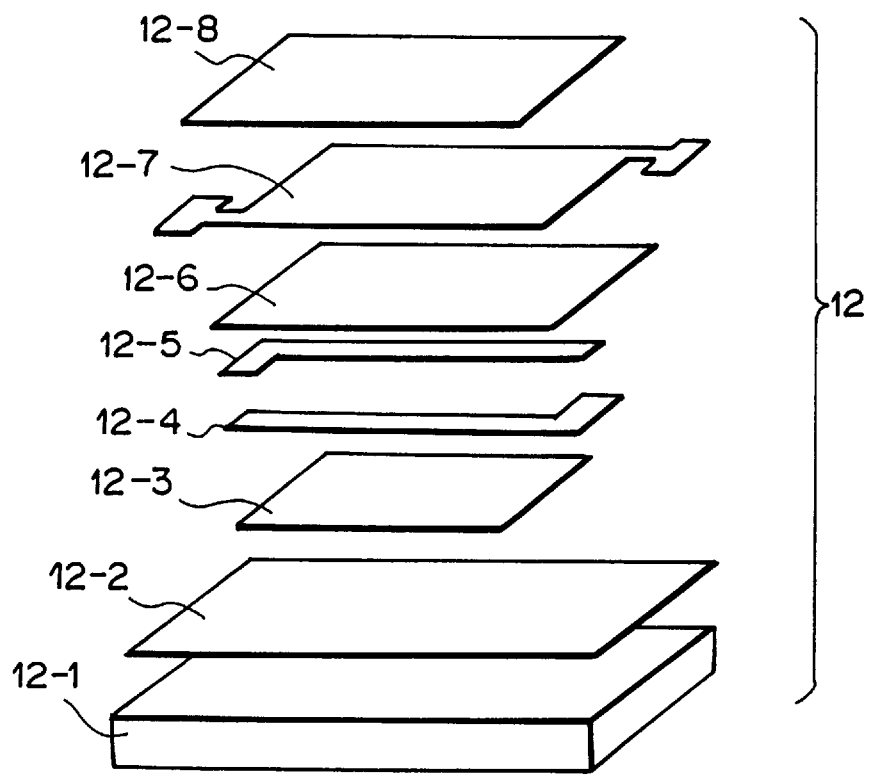
FIG. 4 is an exploded perspective view showing a flow rate detector of the embodiment of the flow rate sensor according to the present invention.

A flow rate detector 12 is disposed in the casing. As shown in FIG. 4, the flow rate detector 12 is designed in a chip structure by forming an insulating layer 12-2 on the upper surface (first surface) of a substrate 12-1, forming a thin-film heating element 12-3 on the insulating layer 12-2, forming on the heating element a pair of electrode layers 12-4, 12-5 for the thin-film heating element, forming an insulating layer 12-6 thereon, forming a flow rate detection thin-film temperature sensing element 12-7 on the insulating layer 12-6 and then forming an insulating layer 12-8 on the flow rate detection thin-film temperature sensing element 12-7. As the substrate 12-1 may be used a member which is set to about 0.5 mm in thickness and about 2 to 3 mm in square and also formed of silicon or alumina (when an insulating substrate of alumina or the like is used, the insulating layer 12-2 may be omitted), and as the thin-film heating element 12-3 may be used a member of cermet which is set to about 1 $\mu$m in thickness and designed in a desired shape by patterning. As the electrode layers 12-4, 12-5 may be used a member which is formed of nickel at a thickness of about 0.5 $\mu$m or a member obtained by laminating gold layer on the above member at a thickness of about 0.1 $\mu$m. The insulating layers 12-2, 12-6, 12-8 may be formed of $SiO_2$ at a thickness of about 1 $\mu$m. As the thin-film temperature sensing element 12-7 may be used a metal resistant film having a large and stable temperature coefficient such as platinum or nickel which is patterned into a desired shape, for example, a meandering shape at a thickness of about 0.5 to 1 $\mu$m (or may be used a member formed of NTC thermistor of manganese oxide). The thin-film heating element 12-3 and the thin-film temperature sensing element 12-7 are disposed so as to be extremely proximate to each other through the thin-film insulating layer 12-6 as described above, whereby the thin-film temperature sensing element 12-7 is immediately affected by the effect of the heating of the thin-film heating element 12-3.

As shown in FIGS. 1 and 2, a fin plate 14 serving as a heat transfer member is joined to the lower surface of the flow rate detector 12, that is, the lower surface (second surface) of the substrate 12-1 by a joint member 16 having excellent thermal conductivity. The fin plate 14 may be formed of copper, duralumin, copper-tungsten alloy or the like. Silver paste may be used as the joint member 16. An opening through which the fin plate 14 is penetrated is formed at the position in the casing main body portion 2 at which the flow rate detector 12 is disposed, and sealing glass is filled in the opening while the fin plate 14 is inserted through the opening, thereby forming a glass seal 18.

The fin plate 14 is bent substantially at the right angle at the center thereof, and the upper horizontal portion thereof is joined to the flow rate detector 12 while the lower vertical portion thereof extends into the pipe line 4. The fin plate 14 extends into the pipe line 4 having a substantially circular shape so as to pass through the center on the section of the pipe line 4 and traverse from the upper portion to the lower portion of the pipe line 4. However, the pipe line 4 is not necessarily circular in section, but may have a proper sectional shape. In the pipe line 4, the dimension $L_1$ of the fin plate 14 in the pipe direction is sufficiently larger than the thickness $L_2$ of the fin plate 14. Therefore, the fin plate 14 can excellently transfer heat between the flow rate detector 12 and the fluid without greatly affecting the flow of the fluid in the pipe line 4.

In the casing, a fluid temperature detector 22 is disposed at a position which is separated from the flow rate detector 12 along the pipe line 4. The temperature detector 22 is designed in such a chip structure that a thin-film temperature sensing element similar to that of the flow rate detector 12 is formed on a substrate similar to that of the flow rate detector 12. The temperature detector 22 is jointed through a joint member having excellent thermal conductivity to a portion of the casing main body portion 2 which is made thin to enhance the heat transfer and located just above the pipe line 4. The fluid temperature detector 22 is preferably disposed at the upstream side with respect to the fluid flowing direction in the pipe line 4.

Resin coatings 20, 24 are formed so as to cover the flow rate detector 12 and the temperature detector 22, respectively. In FIG. 3, these resin coatings are omitted from the illustration.

In the casing, a wiring board 26 is fixedly disposed at a portion other than the flow rate detector 12 and the temperature detector 22. Some electrodes of the wiring board 26 are electrically connected to the electrodes of the flow rate detector 12 by bonding wires 28, and also some electrodes of the wiring board 26 are likewise electrically connected to the electrodes of the temperature detector 22 by bonding wires. These bonding wires 28 are sealed by the resin coatings 20, 24. Some other electrodes of the wiring board 26 are connected to external lead wires 30, and the external lead wires 30 extend to the outside of the casing.

Figure 5:
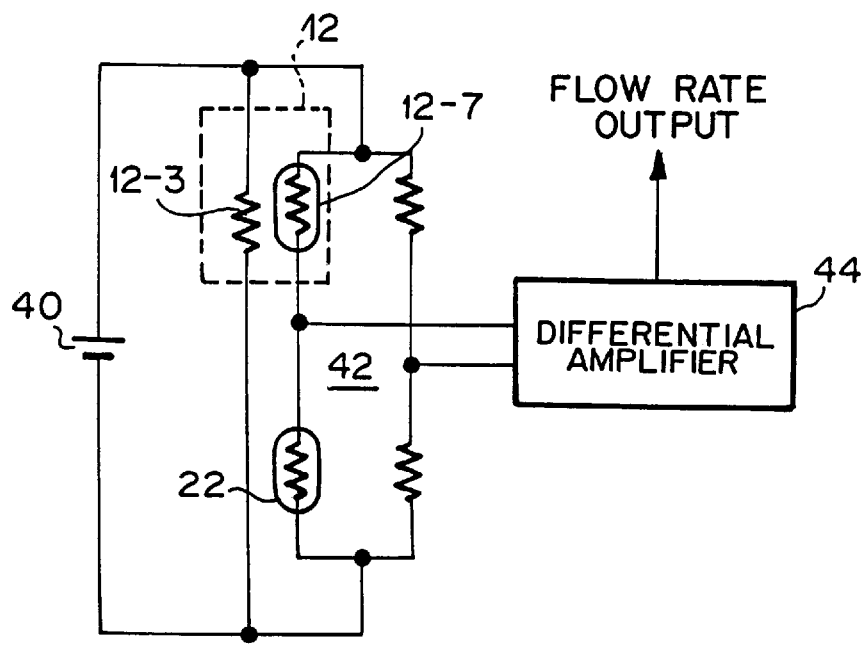
FIG. 5 is a circuit diagram showing the embodiment of the flow rate sensor according to the present invention.

FIG. 5 is a diagram showing the circuit construction of the flow rate sensor of this embodiment. As shown in FIG. 5, the voltage of a DC power source 40 is applied to the thin-film heating element 12-3 and the bridge circuit 42. An output indicating the flow rate is obtained from a differential amplifier 44 in the bridge circuit 42. That is, in the flow rate detector 12, the thin-film temperature sensing element 12-7 executes the temperature sensing operation which suffers the heat absorption effect of the fluid to be detected through the fin plate 14 due to the heating of the thin-film heating element 12-3, and the flow rate of the fluid to be detected in the pipe line 4 is detected on the basis of the temperature sensing result.

According to the above embodiment, an accurate flow rate detection can be performed with sufficiently reflecting the flow rate distribution even when the fluid to be detected is viscous fluid having relatively high viscosity, and further for any type of flow rate distribution in the radial direction on the section of the pipe line 4. Accordingly, even when the flow rate is relatively minute or under a broad environmental temperature condition, the flow rate of the fluid flowing in the pipe can be accurately measured.

In the above embodiment, the fin plate 14 is disposed so as to pass through the center portion on the section of the pipe line and traverse from the upper portion to the lower portion of the pipe line. However, the fin plate 14 may be disposed so as to extend from the upper portion on the section of the pipe line to the vicinity of the central portion. With this construction, for any type flow rate distribution in the radial direction on the section of the pipe line 4, the flow rate detection can be accurately performed with excellently reflecting the flow rate distribution.

Figure 6A:
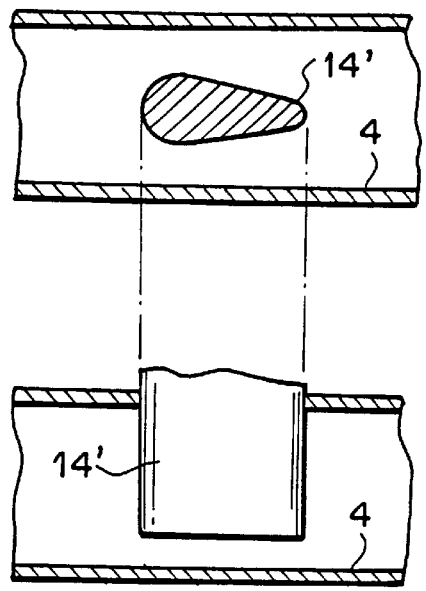
FIGS. 6A and 6B are diagrams showing an embodiment of a heat transfer member of the flow rate sensor according to the present invention.
Figure 6B:
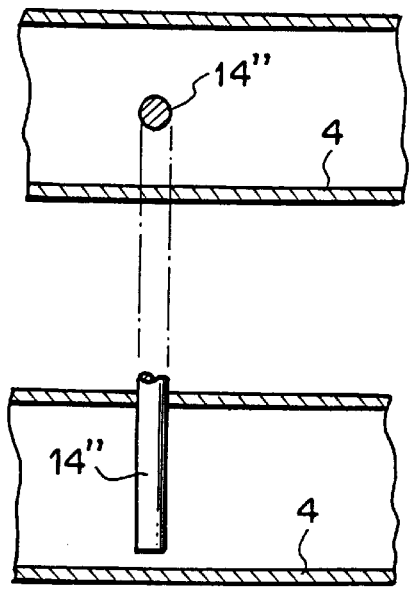

In place of the fin plate 14, another heat transfer member having a different sectional shape in the pipe line may be used. FIGS. 6A and 6B show such different heat transfer members. FIG. 6A shows a fin plate 14' having a streamline shape, particularly a so-called teardrop shape, and it enables heat exchange having high efficiency with suppressing disturbance of the flow of the fluid at maximum. FIG. 6B shows a heat transfer member 14" having a circular sectional shape.

Figure 7A:
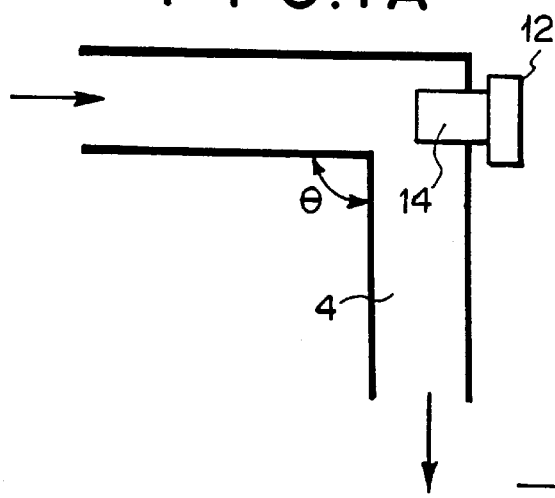
FIGS. 7A and 7B are schematic diagrams showing a modification of the embodiment of the flow rate sensor according to the present invention.
Figure 7B:
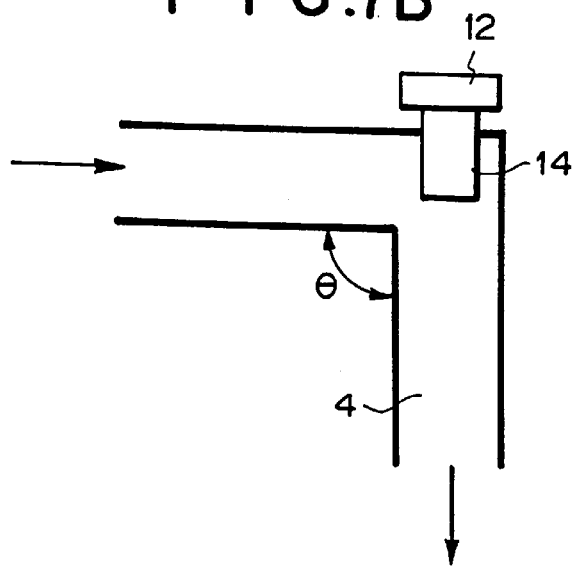

FIGS. 7A and 7B are schematic diagrams showing modifications of the above embodiment. In the modification of FIG. 7A, the pipe line 4 is bent and the fin plate 14 secured to the flow rate detector 12 is located at the bent portion. The bent angle ( of the bent portion is set to any value, and for example it is set so as to satisfy the following inequality: $90° \leq \theta < 180°$. In the embodiment of FIG. 7A, the fin plate 14 is extended at the fluid flow-out side of the bent portion of the pipe line 4. In the embodiment of FIG. 7B, the pipe line 4 is likewise bent, and the fin plate 14 secured to the flow rate detector 12 is located at the bent portion. However, in this embodiment, the fin plate 14 is extended at the fluid flow-in side of the bent portion of the pipe line 4. In order to construct the casing having the same arrangement of the fluid temperature detector 22 and the wiring board 26 as the embodiment shown in FIGS. 1 to 5, the arrangement of FIG. 7B is more preferable.

Figure 8:
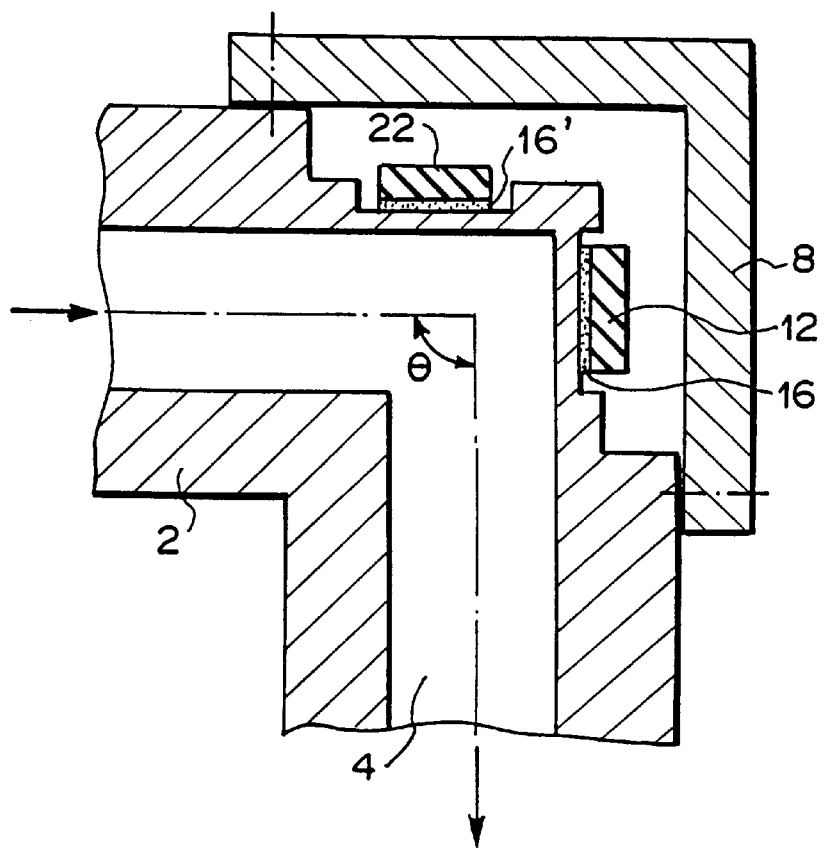
FIG. 8 is a partially cross-sectional view showing the embodiment of the flow rate sensor according to the present invention.

FIG. 8 is a partially cross-sectional view showing another embodiment of the flow rate sensor according to the present invention. In FIG. 8, the elements having the same functions as shown in FIGS. 1 to 6A, 6B, 7A, 7B are represented by the same reference numerals.

In this embodiment, the pipe line 4 is bent, and the flow rate detector 12 is disposed at the fluid flow-out side of the bent portion. That is, the flow rate detector 12 is disposed on the wall at the fluid flow-out side which is located so as to traverse the travel direction of the fluid flowing from the fluid flow-in side. Further, the temperature detector 22 is located at the fluid flow-in side. The flow rate detector 12 and the temperature detector 22 are joined through joint members 16,16' having high thermal conductivity to portions of the casing main body portion 2 which are made thin to enhance the thermal conductivity and located so as to be adjacent to the pipe line 4, respectively.

In this embodiment, since the fluid flowing into the bent portion impinges against the wall of the pipe line on which the flow rate detector 12 is disposed, the flow rate of the fluid can be detected accurately even when the fluid to be detected is viscous fluid having relatively high viscosity, and further for even any type flow rate distribution in the radial direction on the section at the linear portion of the pipe line 4. Accordingly, under a broad environmental temperature condition, the flow rate of the fluid flowing in the pipe line can be accurately measured.

In this embodiment, the bent angle $\theta$ of the bent portion can be set as follows: $45° \leq \theta \leq 135°$.

Figure 9:
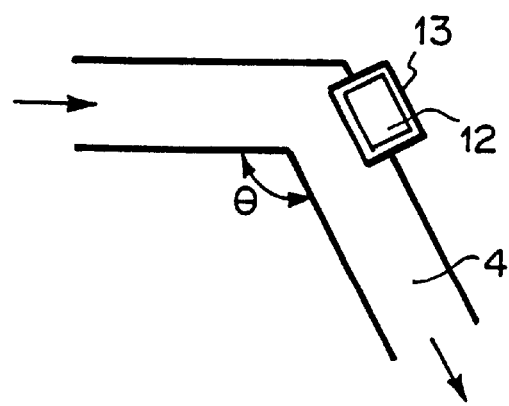
FIG. 9 is a schematic diagram showing a modification of the embodiment of the flow rate sensor according to the present invention.

FIG. 9 is a schematic diagram showing a modification of the embodiment shown in FIG. 8. In this embodiment, the flow rate detector 12 is accommodated in the housing 13 having high thermal conductivity so as to project into the pipe line 4.

Figure 10:
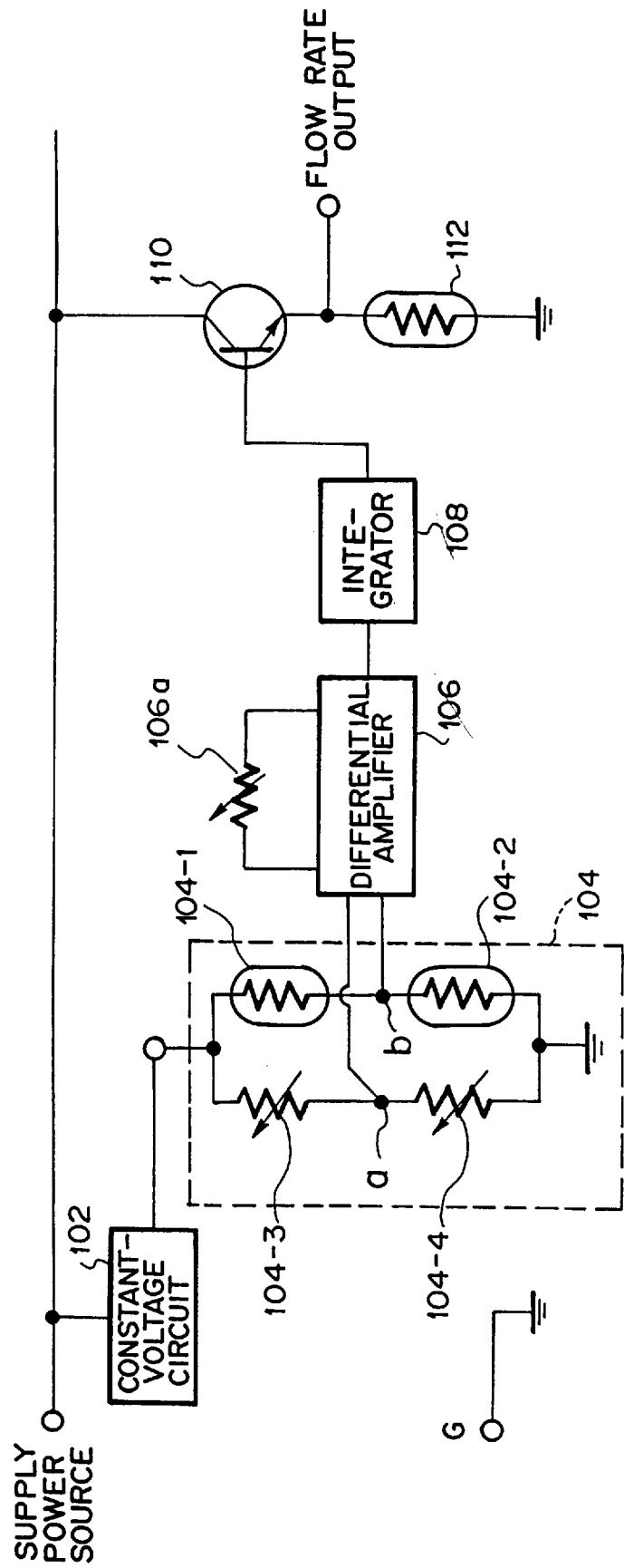
FIG. 10 is a circuit diagram showing the embodiment of the flow rate sensor according to the present invention.

FIG. 10 is a diagram showing the circuit construction of an embodiment of the flow rate sensor according to the present invention. A supply power source is set to +15V ((10%), for example, and it is supplied to a constant-voltage circuit 102. The constant-voltage circuit 102 has an output of 0.1 W at +6V ((3%), and the output thereof is supplied to the bridge circuit 104. The bridge circuit 104 contains a flow rate detection temperature sensing element 104-1, a temperature compensation temperature sensing element 104-2 and variable resistors 104-3, 104-4.

The voltages at points a and b are applied to a differential amplifying circuit 106. The amplification factor of the differential amplifying circuit 106 is made variable by a variable resistor 106a. The output of the differential amplifying circuit 106 is input to an integrating circuit 108. The differential amplifying circuit 106 whose amplification factor is variable and the integrating circuit 108 finction as a response setting means as described later.

The supply power source is connected to the collector of an NPN transistor 110, and the emitter of the transistor 110 is connected to a heating element 112. The output of the integrating circuit 108 is input to the base of the transistor 110. That is, the supply power source supplies current through the transistor 110 to the heating element 112 (that is, applies a voltage to the heating element 112, makes current flow through the heating element and supplies power), and the voltage to be applied to the heating element 112 is controlled by a divided voltage of the transistor 110. The divided voltage of the transistor 110 is controlled by the output current of the integrating circuit 108 input to the base through the resistor, and the transistor 110 functions as a variable resistor and as heating control means for controlling the heating of the heating element 112.

The flow rate sensor of this embodiment has the structure shown in FIGS. 1 to 4. Here, the heating element 112 and the flow rate detection temperature sensing element 104-1 shown in FIG. 10 correspond to the thin-film heating element 12-3 and the thin-film temperature sensing element 12-7 shown in FIG. 4. The temperature detector 22 is designed in such a chip structure that a thin-film temperature sensing element similar to that of the flow rate detector 12 (which corresponds to the temperature compensation temperature sensing element 104-2 of FIG. 10) is formed on a substrate similar to that of the flow rate detector 12.

In the flow rate detector 12, the temperature sensing of the thin-film temperature sensing element 12-7 (104-1) is carried out in the flow rate detector 12 with being affected by the heat absorption of the fluid to be detected through the fin plate 14 due to the heating of the thin-film heating element 12-3 (112). As a result of the temperature sensing, the difference between the voltages Va, Vb at the points a, b of the bridge circuit 104 shown in FIG. 10 is obtained.

The temperature of the flow rate detection temperature sensing element 104-1 is varied in accordance with the flow rate of the fluid, resulting in variation of the value of (Va–Vb). By setting the resistance values of the variable resistors 104-3, 104-4 to proper values in advance, the value of (Va–Vb) can be set to zero when the flow rate of the fluid is equal to a desired value serving as a reference. At this reference flow rate, the output of the differential amplifying circuit 106 is equal to zero, and the output of the integrating circuit 108 is fixed, so that the resistance value of the transistor 110 is also fixed. In this case, the divided voltage to be applied to the heating element is also fixed, and the flow rate output at this time indicates the above reference flow rate.

If the flow rate of the fluid is increased or reduced from the reference flow rate, the output of the differential amplifying circuit 106 is varied in polarity (which differs in accordance with the positive/ negative sign of the resistance-temperature characteristic of the flow rate detection temperature sensing element 104-1) and magnitude in accordance with the value of (Va−Vb), resulting in variation of the output of the integrating circuit 108. The variation speed of the output of the integrating circuit 108 can be adjusted by setting the amplification factor of the differential amplifying circuit 106 with the variable resistor 106a. The response characteristic of the control system can be set by the integrating circuit 108 and the differential amplifying circuit 106.

When the flow rate of the fluid increases, the temperature of the flow rate detection temperature sensing element 104-1 is reduced, and thus the integrating circuit 108 supplies the base of the transistor 110 with such a control input as to reduce the resistance of the transistor 110 so that the heating value of the heating element 112 is increased (that is, the power to be supplied to the heating element 112 is increased).

On the other hand, when the flow rate of the fluid is reduced, the temperature of the flow rate detection temperature sensing element 104-1 is increased. Therefore, the integrating circuit 108 supplies the base of the transistor 110 with such a control input as to increase the resistance of the transistor 110 so that the heating value of the heating element 112 is reduced (that is, the power to be supplied to the heating element 112 is reduced).

As described above, the heat of the heating element 112 is controlled to be fed back so that the temperature detected by the flow rate detection temperature sensing element 104-1 is equal to a target value irrespective of the variation of the flow rate of the fluid at all times (if occasion demands, the polarity of the output of the differential amplifying circuit 106 is properly inverted in accordance with the positive/negative sign of the resistance-temperature characteristic of the flow rate detection temperature sensing element 104-1). At this time, the voltage to be applied to the heating element 112 is matched with the flow rate of the fluid and thus it is picked up as the output of the flow rate.

According to the above embodiment, the temperature of the flow rate detection temperature sensing element 104-1 around the heating element 112 can be kept to a substantially fixed value irrespective of the flow rate of the fluid to be detected, so that the flow rate sensor is not degraded with time lapse and also occurrence of ignition and explosion of the inflammable fluid to be detected can be prevented.

Further, in this embodiment, no constant-voltage circuit is required to the heating element 112, and thus there is an advantage that it is sufficient to use a low-output constant-voltage circuit 102 for the bridge circuit 104. Therefore, the heating value of the constant-voltage circuit can be reduced, and the flow rate detection precision can be kept excellent even if the flow rate sensor is miniaturized.

Figure 11:
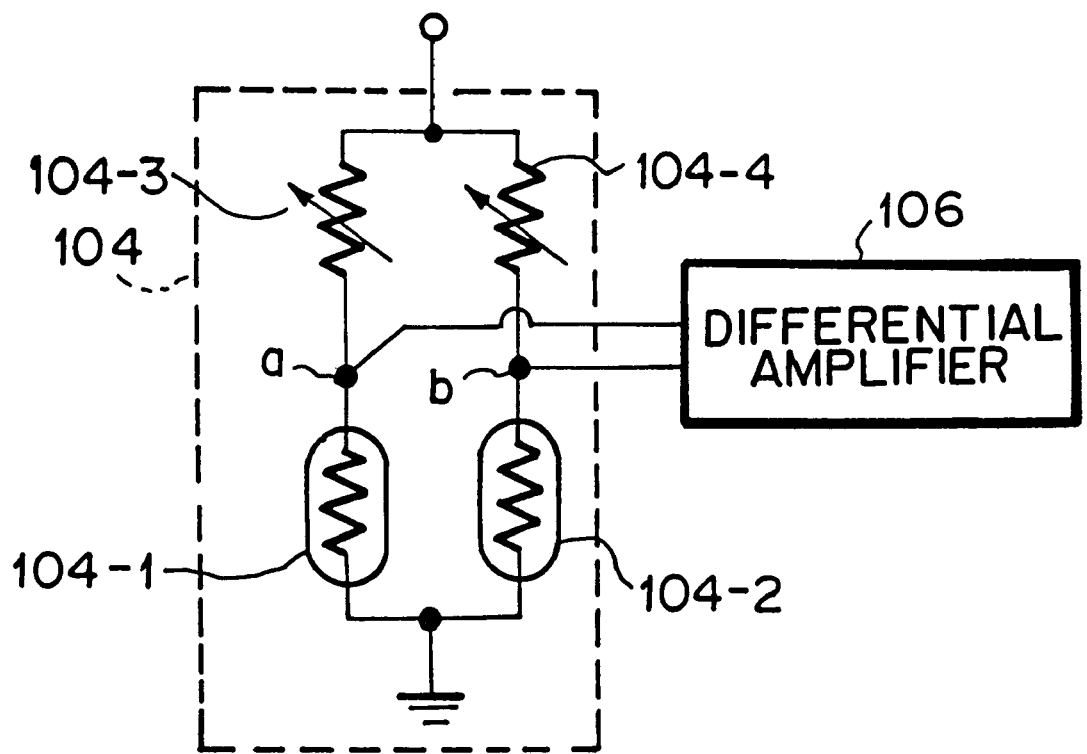
FIG. 11 is a diagram showing a modification of a bridge circuit of the flow rate sensor according to the present invention.

FIG. 11 shows a modification of the bridge circuit 104 of the flow rate sensor of the above embodiment. This modification is different from the above embodiment in the variation characteristic of the output (Va−Vb) to the differential amplifying circuit 106, however, it can perform the same feed-back control.

Figure 12:
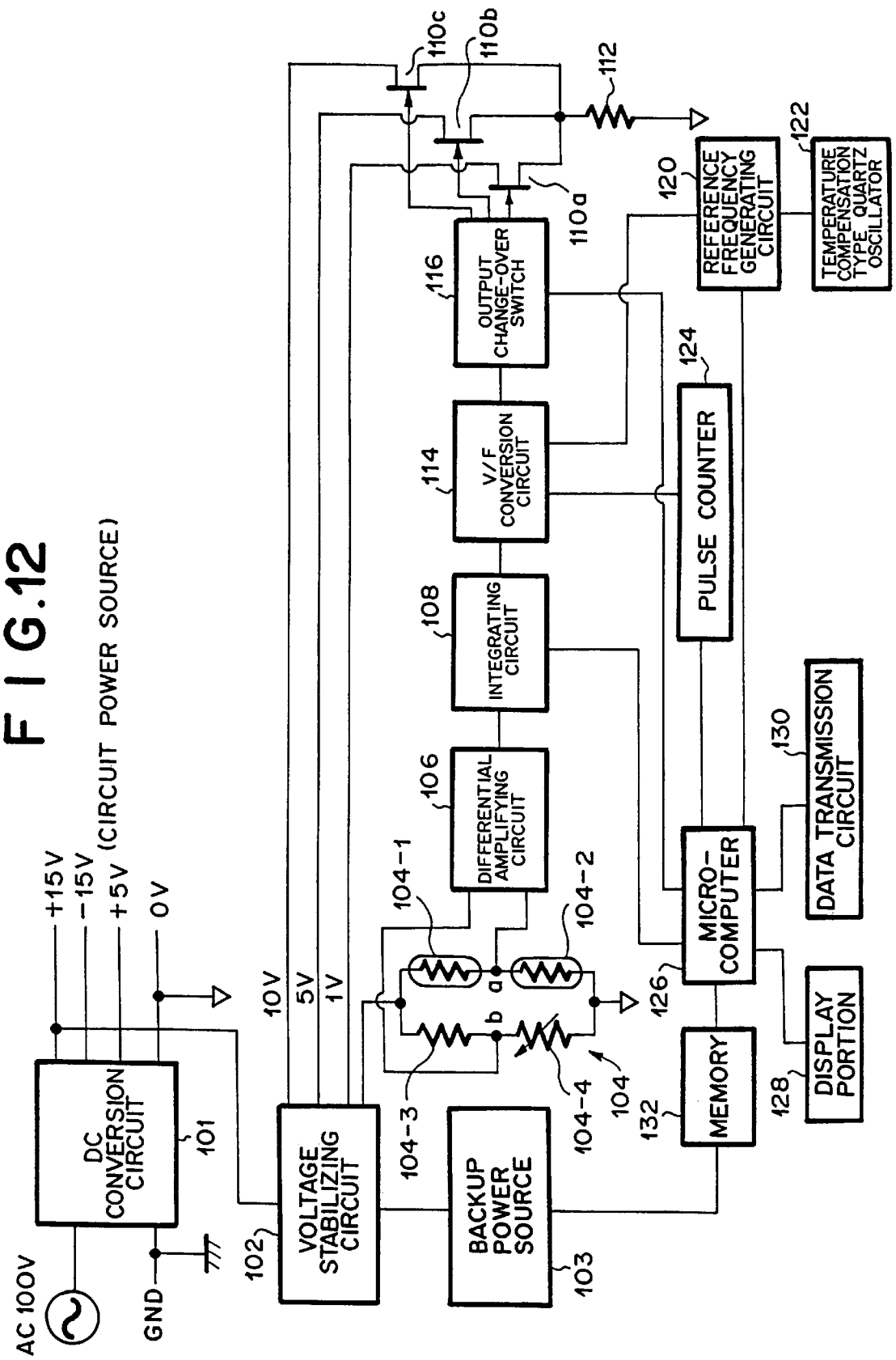
FIG. 12 is a circuit diagram showing an embodiment of a flowmeter according to the present invention.

FIG. 12 is a diagram showing the construction of an embodiment of a flowmeter according to the present invention.

The supply power source uses domestic alternating current of 100V, and a DC conversion circuit 101 outputs DC voltages of +15V, −15V and +5V on the basis of the alternating current of 100V from the supply power source. The DC of +15V output from the DC conversion circuit 101 is input to a voltage stabilizing circuit 102 to output stabilized DC voltages of 1V, 5V and 10V (within precision of 0.1% at 40 to +80° C.) to be supplied to a heater (thin-film heating element) described later.

For example, a stabilized DC voltage of +6V (0.1 W output) is output from the voltage stabilizing circuit 102. The output is supplied to the bridge circuit 104. The bridge circuit 104 is designed to contain the flow rate detection temperature sensing element 104-1, the temperature compensation temperature sensing element 104-2, the resistor 104-3 and the variable resistor 104-4.

The voltages Va, Vb at the points a and b of the bridge circuit 104 are input to the differential amplifying circuit 106 having a variable amplification factor. The output of the differential amplifying circuit 106 is input to the integrating circuit 108. The differential amplifying circuit 106 and the integrating circuit, 108 function as a response setting means of the control system as described later.

The outputs of 1V, 5V, 10V of the voltage stabilizing circuit 102 are input to the heater 112 through three field effect transistors 110a, 110b, 110c for heater current control (for switching), respectively.

A measuring portion (sensor structure portion) of the flowmeter of this embodiment is designed in the same construction as shown in FIGS. 1 to 4. The heater 112 and the flow rate detection temperature sensing element 104-1 shown in FIG. 12 correspond to the thin-film heating element 12-3 and the thin-film temperature sensing element 12-7, respectively. The temperature detector 22 is designed in such a chip structure that a thin-film temperature sensing element (corresponding to the temperature compensation temperature sensing element 104-2 of FIG. 12) similar to that of the flow rate detector 12 is formed on a substrate similar to that of the flow rate detector 12.

The temperature sensing operation is carried out by the thin-film temperature sensing element 12-7 with being affected by the heat absorption effect of the fluid to be detected through the fin plate 14 due to the heating of the thin-film heating element 12-3. As a result of the temperature sensing is obtained the difference between the voltages Va, Vb at the points a and b of the bridge circuit 104 shown in FIG. 12.

The temperature of the flow rate detection temperature sensing element 104-1 is varied in accordance with the flow rate of the fluid, resulting in variation of the value of (Va−Vb). By setting the resistance value of the variable resistor 104-4 to a proper value in advance, the value of (Va−Vb) can be set to zero when the flow rate of the fluid is equal to a desired value serving as a reference. At this reference flow rate, the output of the differential amplifying circuit 106 is equal to zero, and the output of the integrating circuit 108 is fixed (the value corresponding to the reference flow rate). The level of the output of the integrating circuit 108 is adjusted so that the minimum value is equal to 0V.

The output of the integrating circuit 108 is input to a V/F conversion circuit 114 to form a pulse signal having the frequency (for example, $5 \times 10^{-5}$ at maximum) corresponding to the voltage signal. The pulse signal has a fixed (for example, a desired value in the range from 1 to 10 microseconds) pulse width (time width). For example, when the output of the integrating circuit 108 is equal to 1V, a pulse signal of 500 Hz in frequency is output, and when the output of the integrating circuit 108 is equal to 4V, a pulse signal of 2000 Hz in frequency is output.

The output of the V/F conversion circuit 114 is input to an output change-over switch 116. In the switch 116, the output switching operation is carried out so that the output pulse signal of the V/F conversion circuit 114 is supplied to the gate of any one of three switching transistors 110*a*, 110*b* and 110*c* under the control of a microcomputer (micon) described later. Current flows into the heater 112 through the transistor whose gate is supplied with the pulse signal (that is, the transistor selected by the output change-over switch 116). Accordingly, any one voltage of 1V, 5V, 10V is applied to the heater 112 through the transistor selected by the output change-over switch 116 while it is designed in the form of a pulse shape having the frequency corresponding to the output value of the integrating circuit 108 (that is, power is supplied to the heater 112), whereby the heater heats. The heating value of the heater 112 is substantially proportional to the square of the applied voltage thereto. Therefore, according to this embodiment, in the case of the applied voltage of 5V, 10V, the heating value which is about 25 times and about 100 times as high as that in the case of the applied voltage of 1V respectively can be obtained.

In this embodiment, the flow rate range to be measured is divided into three flow rate areas. The applied voltage of 1V, 5V, 10V selected by the switching transistors 110*a*, 110*b*, 110*c* are respectively used for the measurement of a low flow rate area (for example, 10 to 500 cc/hour), an intermediate flow rate area (for example, 100 to 5,000 cc/hour) and a high flow rate area (for example, 1,000 to 20,000 cc/hour) respectively. As described above, the adjacent flow rate areas may be partially overlapped with each other.

In a reference frequency generating circuit 120, the frequency of the V/F conversion circuit 114 is set on the basis of a high-precision clock which is set on the basis of the oscillation of a temperature compensation type quartz oscillator 122. The pulse signal output from the V/F conversion circuit 114 is counted by a pulse counter 124. On the basis of a pulse count result (pulse frequency) obtained on the basis of the frequency generated in the reference frequency generating circuit 120, a microcomputer 126 converts it to the corresponding flow rate (instantaneous flow rate), and integrates the flow rate thus converted with respect to time to calculate an integrated flow rate. The values of the instantaneous flow rate and the integrated flow rate are displayed by a display portion 128 and also transmitted to the outside by a data transmission circuit 130 (a telephone line or other networks may be used as a transmission path). If desired, the data of the instantaneous flow rate and data of the integrated flow rate may be stored in a memory 132. 103 represents a backup power source (for example, battery).

Here, when the flow rate of the fluid is increased/reduced, the output of the differential amplifying circuit 106 is varied in polarity (varied in accordance with the positive/negative sign of the resistance temperature characteristic of the flow rate detection temperature sensing element 104-1) and magnitude in accordance with the value of (Va−Vb), resulting in variation of the output of the integrating circuit 108. The variation speed of the output of the integrating circuit 108 can be adjusted by setting the amplification factor of the differential amplifying circuit 106. The response characteristic of the control system is set by the integrating circuit 108 and the differential amplifying circuit 106.

When the fluid flow rate is increased, the temperature of the flow rate detection temperature sensing element 104-1 is reduced, so that such an output (higher voltage value) as to increase the heating value of the heater 112 (that is, increase the pulse frequency) is obtained from the integrating circuit 108. At the time when the output of the integrating circuit is equal to the voltage corresponding to the fluid flow rate, the bridge circuit 104 is kept in an equilibrium state.

On the other hand, when the fluid flow rate is reduced, the temperature of the flow rate detection temperature sensing element 104-1 increases, so that such an output (lower voltage value) as to reduce the heating value of the heating element 112 (that is, reduce the pulse frequency) is obtained from the integrating circuit 108. At the time when the output of the integrating circuit is equal to the voltage corresponding to the fluid flow rate, the bridge circuit 104 is kept in an equilibrium state.

That is, in the control system of this embodiment, the frequency (corresponding to the heating value) of the pulsed current to be supplied to the heater 112 is set so that the bridge circuit 104 is kept in the equilibrium state, and such an equilibrium state (the response of the control system) can be implemented within 0.1 second, for example.

Here, a case where the fluid flow rate is greatly varied will be described. The lower limit value (for example, a value slightly larger than 0V) and the upper limit value (for example, a value slightly lower than the saturated voltage value) are set for the output of the integrating circuit 108, and the measurement of the flow rate is carried out only when the output is within this range. Therefore, the microcomputer 126 monitors the output of the integrating circuit 108 at all times, and if the output is reduced to the lower limit value, it controls the output change-over switch 116 so as to select the switching transistor connected to the power source having a lower voltage. Conversely, when the output of the integrating circuit 108 increases to the upper limit value, the microcomputer 126 controls the output change-over switch 116 so as to select the switching transistor connected to the power source having a higher voltage. When neither the lower voltage source nor the higher voltage source exist, the switching operation of the output change-over switch 116 is not carried out. However, actually, the flow rate areas and the circuit characteristic are set so that such a situation can be avoided. The same function can be implemented by setting the upper and lower limit values for the output of the V/F conversion circuit 114 in place of the output of the integrating circuit 108 and monitoring the output of the V/F conversion circuit 114 with the microcomputer 126 at all times.

Of course, a different conversion coefficient is used in accordance with the currently-selected flow rate area when the conversion from the pulse number to the flow rate is carried out by the microcomputer 126.

As described above, even when the fluid flow rate varies, the heating of the heater 112 is subjected to the feed-back control so that the temperature detected by the flow rate detection temperature sensing element 104-1 is equal to a target value at all times (the polarity of the output of the differential amplifying circuit 106 is properly inverted in accordance with the positive/negative sign of the resistance-temperature characteristic of the flow rate detection temperature sensing element 104-1 if necessary). At this time, the frequency of the pulsed voltage applied to the heater 112 (the frequency of the output of the V/F conversion circuit 114) corresponds to the fluid flow rate (it does not strictly correspond to the fluid flow rate during a time period until the bridge circuit 104 reaches the equilibrium state, however, there is no practical problem because the time variation of the flow rate is usually extremely longer than the time at which the bridge circuit 104 reaches the equilibrium state), and thus it is picked up as the flow rate output.

According to this embodiment, the pulse signal generated in the V/F conversion circuit 114 is used for the measurement of the flow rate, and it is easy to sufficiently reduce the error of this pulse signal due to the temperature variation, so that it is possible to remarkably reduce the measurement error of the flow rate and the integrated flow rate calculated on the basis of the pulse frequency. Further, according to this embodiment, the control of the current supply to the heater 112 is performed by the ON-OFF operation based on the pulse signal generated in the V/F conversion circuit 114, so that occurrence of the control error due to the temperature variation is extremely reduced. Further, the current supply to the heater of one flow rate sensor is switched by the switching operation of the plural switching means (switching transistors) on the basis of the pulse signal for the flow rate measurement, whereby the flow rate in the wide range can be measured with high precision under the optimum condition.

In this embodiment, the minute chip structure containing the thin-film heating element and the thin-film temperature sensing element is used as the flow rate detector, so that the high-speed response as described above can be achieved and the precision of the flow rate measurement can be enhanced.

Further, in this embodiment, irrespective of the flow rate of the fluid to be detected, the temperature of the flow rate detection temperature sensing element 104-1 around the heater 112 is kept substantially constant, so that the time degradation of the flow rate sensor can be reduced and the occurrence of the ignition and explosion of the inflammable fluid to be detected can be prevented.

FIGS. 13, 14A, 14B, 15A and 15B are diagrams showing an embodiment of a portable flowmeter according to the present invention. As shown in these figures, the portable flowmeter 201 comprises a casing 202, a flow pipe 203, a flow rate sensor 204, a temperature sensor 205, a display portion 206, an operating portion 207 and a circuit board 208.

The casing 202 is formed of synthetic resin such as vinyl chloride resin or the like, and it comprises a main body portion 209 and a lid portion 210 which is detachably mounted on the main body portion 209. Both the end portions of the main body portion 209 are designed as connection portions 211, 212 which will be connected to external pipes, and the flow pipe 203 is disposed so as to penetrate through the main body portion 209. A sensor insertion space 213 is formed at the upper portion of the main body portion 209, and sensor insertion holes 214, 215 are formed so as to extend from the sensor insertion space 213 to the flow pipe 203. The flow pipe 203 is an annular pipe formed of metal such as copper, iron, stainless steel or the like, and opening portions 216, 217 are formed at the positions corresponding to the sensor insertion holes 214, 215.

Figure 16A:
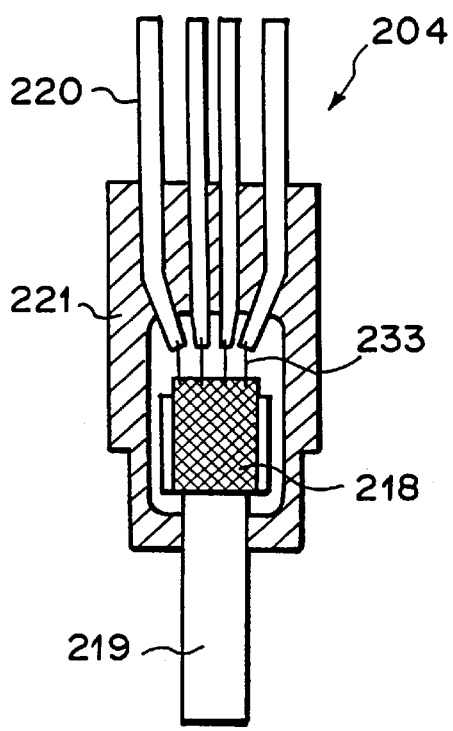
FIGS. 16A and 16B are front sectional view and side sectional view showing a flow rate sensor.
Figure 16B:
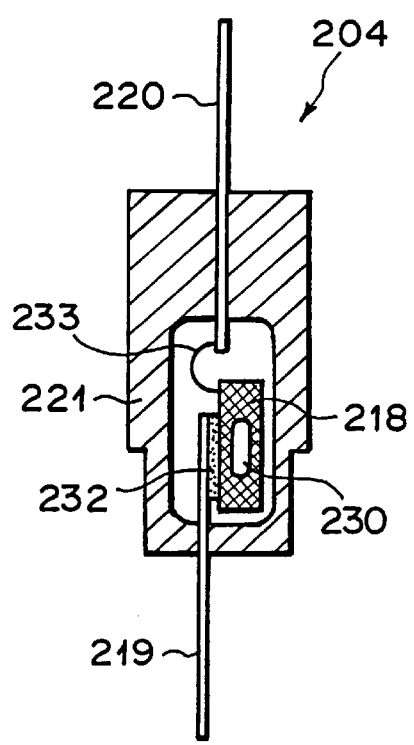
Figure 17:
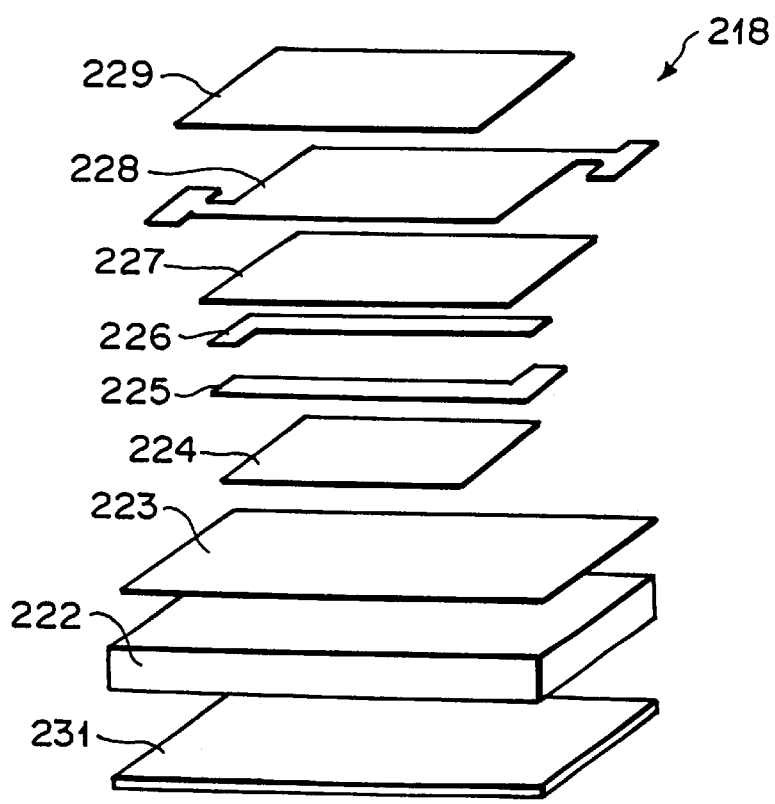
FIG. 17 is an exploded, perspective view showing the flow rate detector of the flow rate sensor.

As shown in FIGS. 16A, 16B, the flow rate sensor 204 comprises a flow rate detector 218, a fin plate 219, an output terminal 220 and a coating member 221. As shown in FIG. 17, the flow rate detector 218 is designed in such a chip structure that an insulating layer 223, a thin-film heating element 224, electrode layers 225, 226, an insulating layer 227, a thin-film temperature sensing element 228 and an insulating layer 229 are laminated in this order on a substrate 222.

Figure 18:
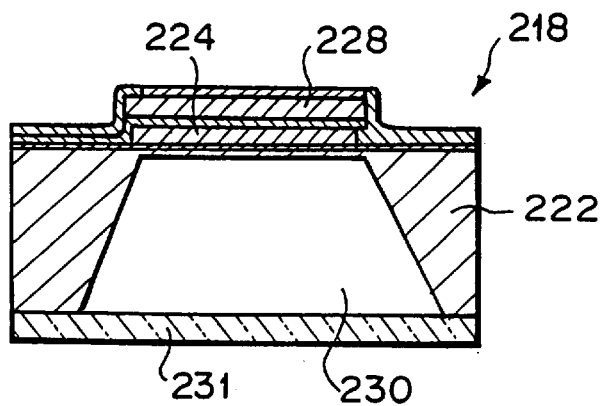
FIG. 18 is a longitudinal sectional view showing the flow rate detector of the flow rate sensor.

The substrate 222 is formed of a rectangular plate of silicon, alumina or the like which has a thickness of 600 $\mu$m and a size of about 2×3 mm. As shown in FIG. 18, a recess portion 230 having a depth of 550 $\mu$m is formed by etching or the like from the opposite surface of the substrate to the surface on which the heating element 224 and the temperature sensing element 228 are laminated. A glass plate 231 having a thickness of 50 to 200 $\mu$m is fixed to the opposite surface of the substrate 222 to the surface on which the heating element 224 and the temperature sensing element 228 are laminated to completely seal the recess portion 230.

The heating element 224 is formed of cermet which has a thickness of about 1 $\mu$m and is designed in a desired shape by patterning, and the electrode layers 225, 226 are formed of nickel at a thickness of about 0.5 $\mu$m or formed of a lamination film obtained by laminating a gold film of about 0.5 $\mu$m on a nickel film of about 0.5 $\mu$m. The temperature sensing element 228 has a thickness of about 0.5 to 1 $\mu$m and is formed of a metal resistant film of platinum, nickel or the like which is patterned in a desired shape, for example, a meandering shape and has a large and stable resistance-temperature coefficient, or an NTC thermistor of manganese oxide. The insulating layers 223, 227, 229 are formed of $SiO_2$ at a thickness of about 1 $\mu$m.

The fin plate 219 is formed of material having excellent thermal conductivity such as copper, duralumin, copper-tungsten alloy or the like, and it is a rectangular thin plate of 200 $\mu$m in thickness and about 2 mm in width.

As shown in FIGS. 16A and 16B, the flow rate detector 218 is fixed to the surface of the upper end portion of the fin plate 219 through a joint member 232 of silver paste or the like so that the surface of the flow rate detector 218 on which the heating element 224 and the temperature sensing element 228 are laminated is confronted to the surface of the upper end portion of the fin plate 219. The flow rate detector 218 is connected to the output terminal 220 by a bonding wire 233, and the flow rate detector 218, the upper half portion of the fin plate 219 and the lower half portion of the output terminal 20 are coated with the coating member 221 formed by molding.

Various methods may be used to manufacture the flow rate sensor 204, and the fin plate 219 and the output terminal 220 may be unified.

Figure 19:
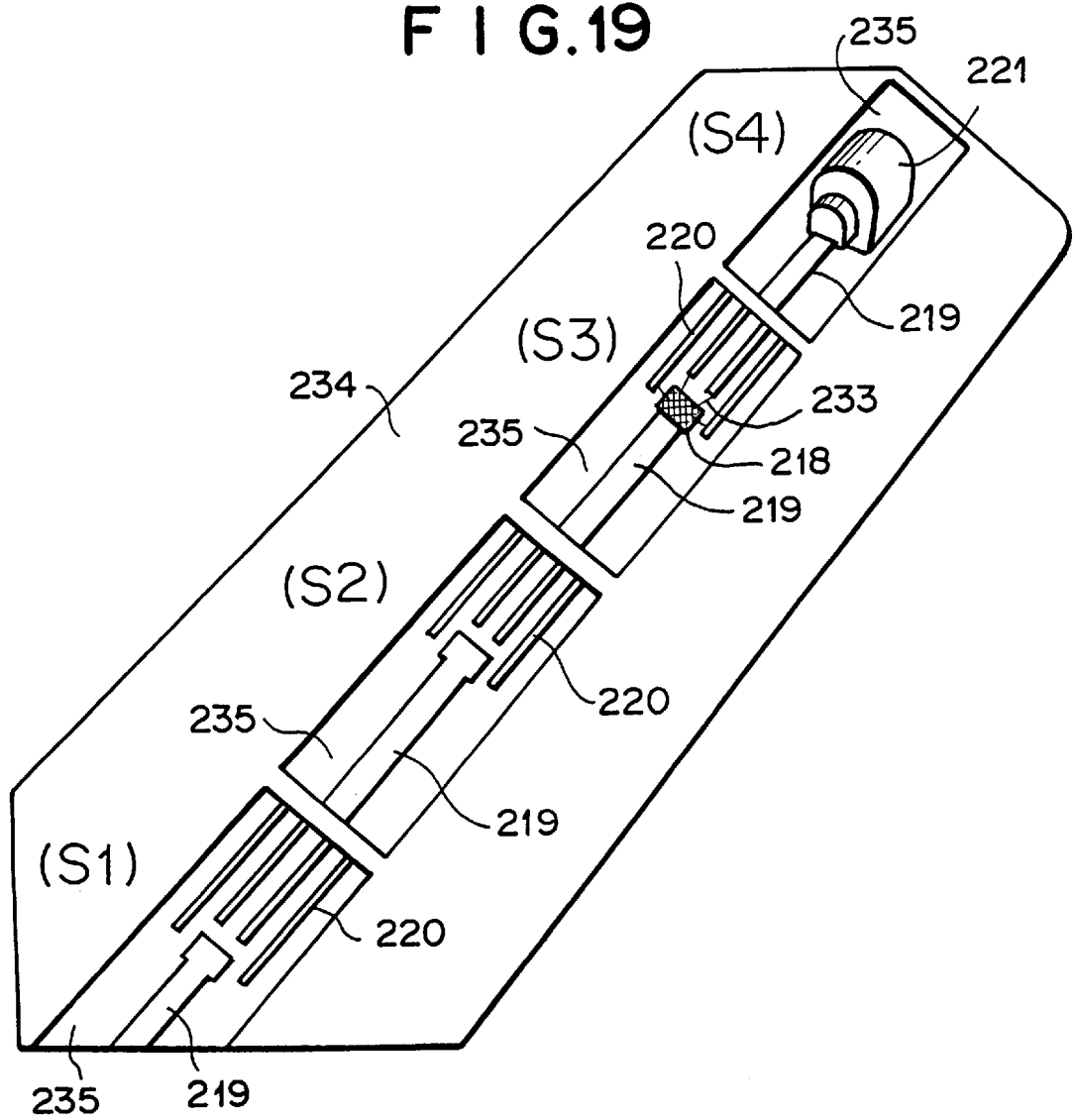
FIG. 19 is an explanatory diagram showing a manufacturing process of the flow rate sensor.

For example, the following process may be adopted. As shown in FIG. 19, there are successively carried out a step of etching a plate 234 to form a plate base member 235 having a predetermined shape (S1), a step of conducting silver plating treatment on a portion to which the flow rate detectors 218 will be joined (S2), a step of coating silver paste on the portion to fix the flow rate detector 218 to the portion, connecting the flow rate detector 218 and the output terminal 220 by a bonding wire 233 and conducting nickel plating on the portion corresponding to the fin plate 219 (S3), and a step of molding the flow rate detector 218, the upper half portion of the fin plate 219 and the lower half portion of the output terminal 220 with epoxy resin to form the coating member 221 (S4), thereby obtaining the flow rate sensor 204 as shown in FIGS. 16A and 16B.

The temperature sensor 205 has the construction similar to the flow rate sensor 204, and comprises the temperature detector obtained by removing the heating element 224, the electrode layers 225, 226 and the insulating layer 227 from the flow rate detector 218 of the flow rate sensor 204, a fin plate 237, an output terminal and a coating member similar to those of the flow rate sensor 204.

The same method as the flow rate sensor 204 may be used as a method of manufacturing the temperature sensor 205.

In the flow rate sensor 204, the temperature sensing element 228 is heated by supplying current to the heating element 224, and the variation of the electrical resistance value of the temperature sensing element 228 is detected. Here, since the flow rate sensor 204 is disposed on the flow pipe 203, a part of the heating value of the heating element 224 is dissipated through the fin plate 219 into kerosene flowing in the flow pipe 203, and the heating value transferred to the temperature sensing element 228 is equal to a value obtained by subtracting the dissipated heating value into the kerosene from the heating value of the heating element 224. Since the dissipated heating value is varied in accordance with the flow rate of the kerosene, the flow rate of the kerosene flowing in the flow pipe 203 can be measured by detecting the variation of the electrical resistance value of the temperature sensing element 228 varying in accordance with the heating value to be supplied thereto.

Figure 15A:
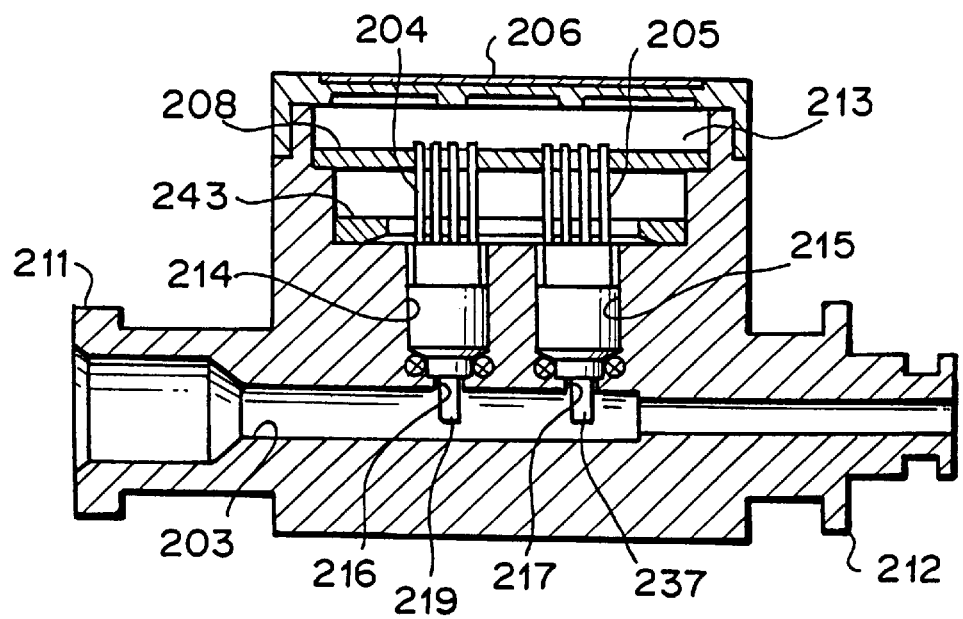
FIGS. 15A and 15B are front sectional view and side sectional view showing the portable flowmeter according to the present invention.

Further, since the dissipated heating value is varied in accordance with the temperature of the kerosene, as shown in FIG. 15A, the temperature sensor 205 is disposed at a proper position of the flow pipe 203, and a temperature compensating circuit is added in the flow rate detection circuit for detecting the variation of the electrical resistance value of the temperature sensing element 228 to thereby suppress the error of the flow rate measurement value due to the temperature of the kerosene at maximum.

In the flow rate sensor 204, the recess portion 230 is formed in the substrate 222 of the flow rate detector 218 to form an air layer having a high adiabatic effect in the recess portion 230, and the flow rate detector 218 is fixed to the surface of the upper end portion of the fin plate 219 while the surface of the flow rate detector 218 on which the heating element 224 and the temperature sensing element 228 are laminated is confronted to the surface of the upper end portion of the fin plate 219, thereby reducing the contact area between the coating member 221 and the heating element 224 or the temperature sensing element 228 at maximum, so that the heating value possessed by the temperature sensing element 228 or the heating value transferred through the fin plate 219 can be suppressed from flowing out of or flowing into the coating member 221 at maximum.

Accordingly, the sensitivity of the flow rate sensor 204 is not reduced even when the specific heat of the fluid is small, even when the flow rate is small, etc.

Further, in the flow rate sensor 204, the flow rate detector 218, the upper half portion of the fin plate 219 and the lower half portion of the output terminal 220 are coated by the coating member 221 formed by molding, so that it can be surely inserted into the sensor insertion hole 214, 215 of the casing 202, and the heating value transferred to the fin plate 219 can be extremely suppressed from flowing into and out of the casing 202 through the metal flow pipe 203 due to an incomplete sealing state.

Also from this viewpoint, the sensitivity of the flow rate sensor 204 is not reduced even when the specific heat of the fluid is small, even when the flow rate is small, etc.

Still further, in the flow rate sensor 204, the flow rate detector 218, the upper half portion of the fin plate 219 and the lower half portion of the output terminal 220 are coated with the coating member 221 and unified into one body by molding, and it is sufficient to merely insert the unified body into the sensor insertion hole 214,215 formed in the casing 202. Therefore, the flow rate sensor 204 can be remarkably simply installed into the casing 202, and also it can be stably fixed and has high durability.

Figure 13:
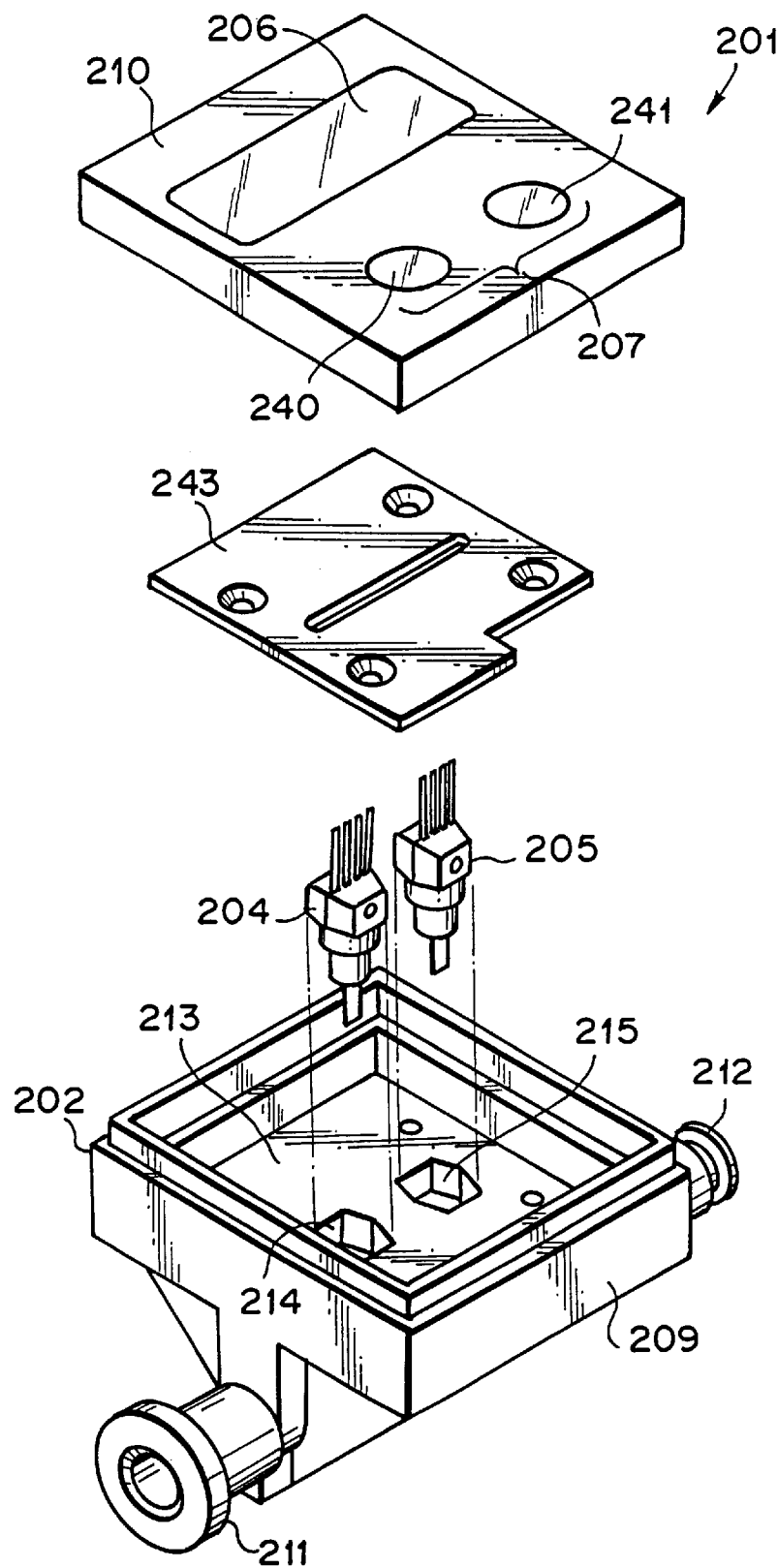
FIG. 13 is an exploded perspective view showing a portable flowmeter according to the present invention.
Figure 14A:
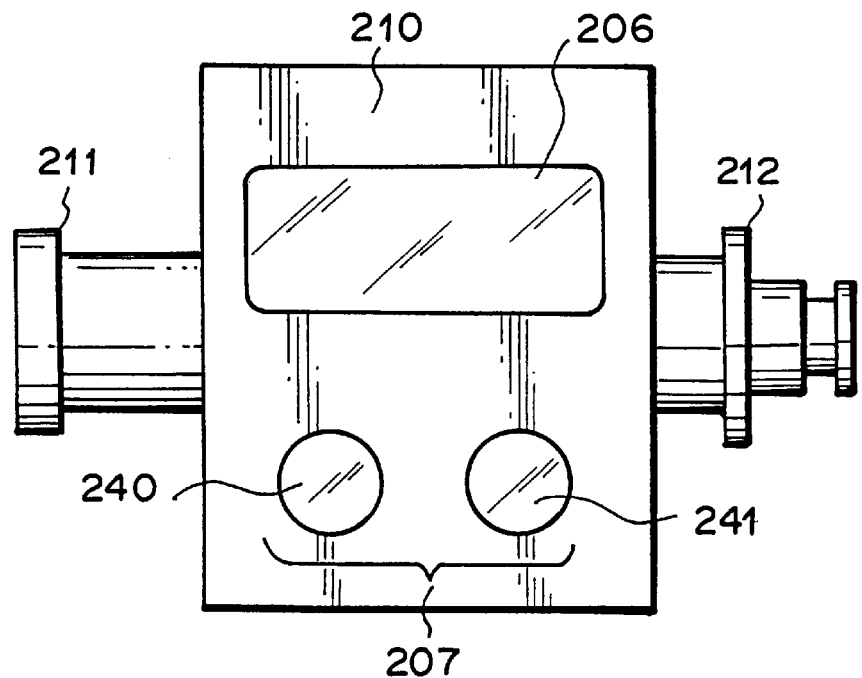
FIGS. 14A and 14B are a plan view showing the portable flowmeter of the present invention and a plan view showing the portable flowmeter at the state where a lid portion is removed, respectively.
Figure 14B:
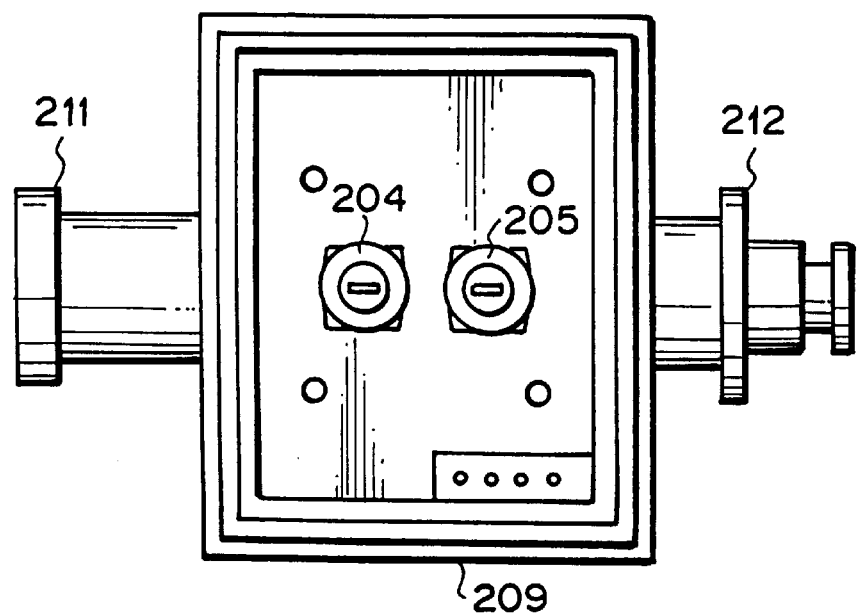

The display portion 206 and the operating portion 207 are disposed on the upper surface of the lid portion 210 of the casing 202 as shown in FIGS. 13, 14A and 14B. The display portion 206 comprises a liquid crystal panel, and the measurement value of the flow rate is digitally displayed on the display portion 206. The operating portion 207 comprises a power source button 240 and a measurement button 241.

The power is supplied by pushing the power source button 240, and the measurement is carried out by pushing the measurement button 241.

Figure 15B:
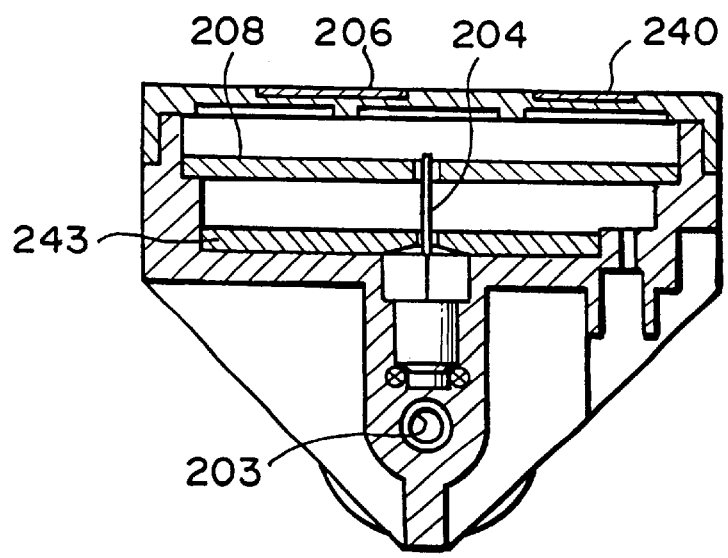

As shown in FIGS. 13, 15A, 15B, the flow rate sensor 204 and the temperature sensor 205 are inserted from the sensor insertion space 213 of the casing 202 into the sensor insertion holes 214, 215, the lower half portions of the fin plates 219 and 237 are inserted through the opening portions 216 and 217 of the flow pipe 203 and located in the flow pipe 203, and the lower ends of the fin plates 219, 237 are extended to the lower side with respect to the axial line of the flow pipe 203.

An O ring is interposed between the flow rate sensor 204 or the temperature sensor 205 and the sensor insertion hole 214,215 to prevent the fluid from leaking through the gap between each sensor and each hole.

After the flow rate sensor 204, the temperature sensor 205 is inserted, a sensor-pressing plate 243 is inserted into the sensor insertion space 213 to press the upper surface of the coating member 221 of the flow rate sensor 204 and the temperature sensor 205.

Further, the circuit board 208 is inserted and disposed in the sensor insertion space 213, and the lid portion 210 is mounted on and fixed to the main body portion 209 to construct the portable flowmeter 201.

The circuit board 208 is electrically connected to the flow rate sensor 204, the temperature sensor 205, the display portion 206, the operating portion 207 and a power source cord (not shown), and an electrical circuit as shown in FIG. 20 is constructed as a whole.

First, AC 100V serving as the power source is properly converted to DC voltage by a DC conversion circuit 245. The DC voltage thus obtained is stabilized by a voltage stabilizing circuit 246, and the voltage is applied to the heating element 224 of the flow rate sensor 204 and a bridge circuit 247.

The bridge circuit 247 comprises the temperature sensing element 228 of the flow rate sensor 204, the temperature sensing element 248 of the temperature sensor 205, a resistor 249 and a variable resistor 250. Since the electrical resistance value of the temperature sensing element 228 is varied in accordance with the flow rate of kerosene, the voltage difference Va−Vb at the points a and b of the bridge circuit 247 is also varied.

The voltage difference Va−Vb is input through a differential amplifying circuit 251 and an integrating circuit 252 to a V/F conversion circuit 253. In the V/F conversion circuit 253, the pulse signal having the frequency corresponding to the voltage signal input thereto is formed. The frequency of the V/F conversion circuit 253 is formed on the basis of the reference frequency which is set on the basis of the high-precision clock formed in the reference frequency generating circuit 255 on the basis of the oscillation of a temperature compensation type quartz oscillator 254.

When the pulse signal output from the V/F conversion circuit 253 is input to the transistor 256, current flows through the heating element 224 and the heating element 224 heats. The pulse signal is also counted by a counter 257, and it is converted to the flow rate corresponding to the frequency thereof in the microcomputer 258. The flow rate value thus converted is digitally displayed on the display portion 206, and also stored in a memory 259.

260 represents a backup power source such as a battery or the like.

Next, a method of using the portable flowmeter 201 according to the present invention will be described. When the portable flowmeter 201 is used, it is necessary to design the pipe of a kerosene burning apparatus so that the portable flowmeter 201 can be mounted on the pipe. Accordingly, the structure of the pipe will be described.

Figure 21A:
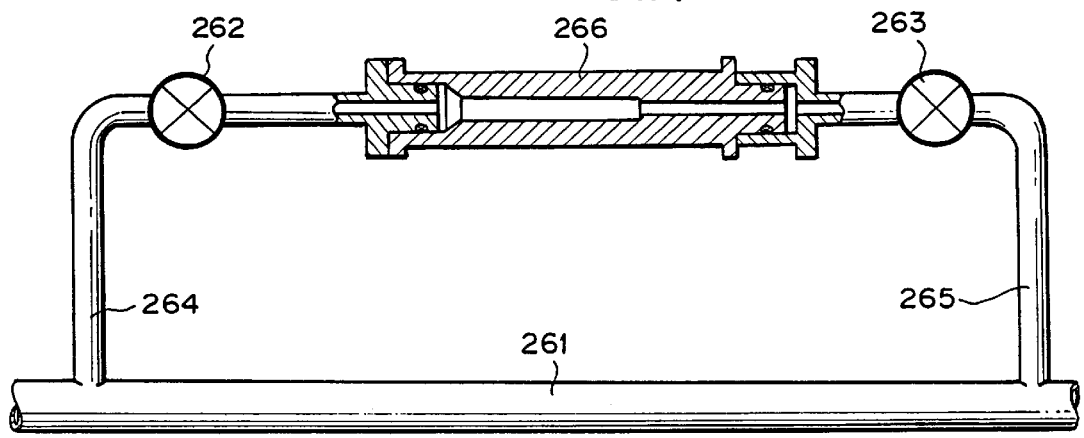
FIGS. 21A and 21B are diagrams showing a method of mounting the portable flowmeter of the present invention on an external pipe to which a bypass pipe is secured.

First, there may be considered such a structure that bypass pipes 264 and 265 to which open/close valves 262 and 263 are secured respectively are secured to the pipe 261 of the kerosene burning apparatus and usually a connection pipe 266 is mounted as shown in FIG. 21A.

Figure 21B:
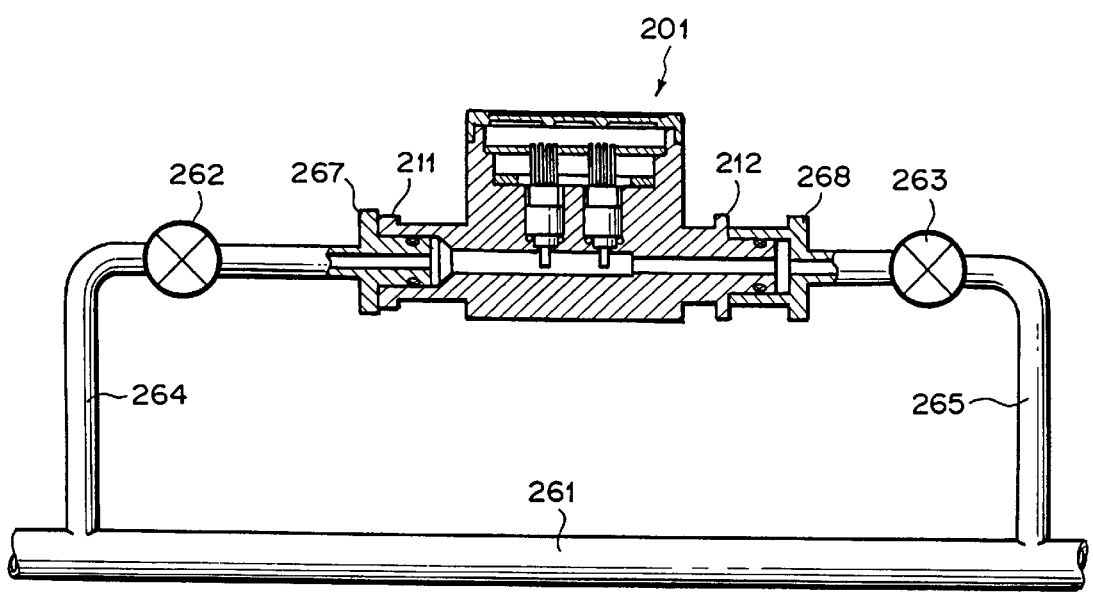

According to this structure, the open/close valves 262, 263 are first closed, and then the connection pipe 266 is removed from the bypass pipes 264, 265. Subsequently, the connection portions 211, 212 of the portable flowmeter 201 are connected to the connection portions 267, 268 of the bypass pipes 264,265, and the portable flowmeter 201 is mounted as shown in FIG. 21B. Thereafter, the open/close valves 262, 263 are opened.

Secondly, there may be considered such a structure that self seal couplings 269, 270 are secured to the pipe 261 of the kerosene burning apparatus.

Figure 22A:
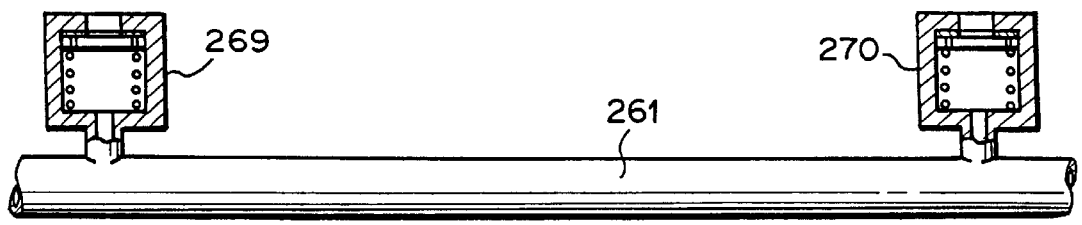
FIGS. 22A and 22B are diagrams showing a method of mounting the portable flowmeter of the present invention on an external pipe to which a self seal coupling is secured.
Figure 22B:
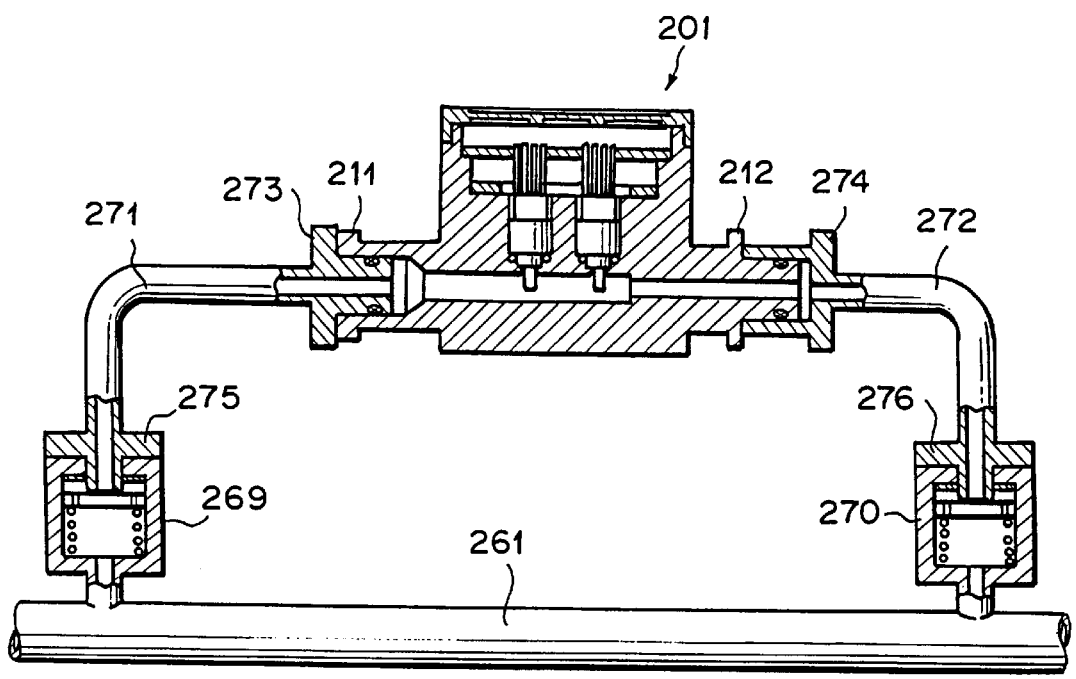

According to this structure, the connection portions 211, 212 of the portable flowmeter 201 are connected to the connection portions 273, 274 of connection pipes 271,272, the connection portions 275, 276 of the connection pipes 271, 272 are connected to the self seal couplings 269, 270, and thus the portable flowmeter 201 is mounted as shown in FIG. 22B.

When the portable flowmeter is mounted to the self seal couplings as described above, it is unnecessary to dispose the open/close valves, and the mounting work is simple. Therefore, this structure is more preferable.

After the portable flowmeter 201 is mounted on the pipe 261 of the kerosene burning apparatus, the power source button 240 is pushed to supply the power, and then the measurement button 241 is pushed to close the electrical circuit shown in FIG. 20.

With the above operation, the electrical resistance value of the temperature sensing element 228 is varied in accordance with the flow rate of kerosene, the voltage difference Va−Vb appears across the points a, b of the bridge circuit 247, the pulse signal formed in the V/F conversion circuit 253 is counted by the counter 257, it is converted to the flow rate by the microcomputer 258 and the flow rate value is digitally displayed on the display portion 206.

If a worker watches the flow rate value and finds that it is below a predetermined value, the worker judges that foreign matter invades into the nozzle of the burner and the discharge port is partially closed, and carries out a work of removing the foreign matter from the nozzle.

Figure 23:
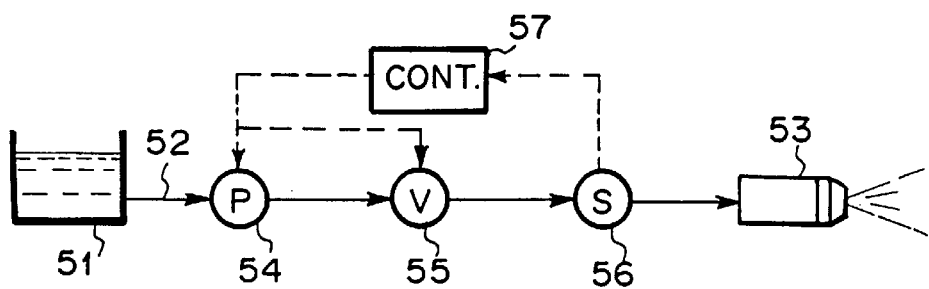
FIG. 23 is a schematic diagram showing an embodiment of a discharge amount control device of liquid discharge equipment according to the present invention.

FIG. 23 is a schematic diagram showing a first embodiment of a discharge amount control appatatus of liquid discharging equipment according to the present invention. In this embodiment, a non return type nozzle is used as the liquid discharge equipment, and fuel oil such as kerosene or the like is used as liquid to be supplied to or discharged from the nozzle.

In FIG. 23, 51 represents a fuel oil tank serving as a liquid supply source. The tank is connected to one end of a pipe line 52, and a non return type nozzle 53 is connected to the other end of the pipe line 52. The nozzle 53 constitutes a non return type hydraulic oil burner having an air supply nozzle, ignition means, etc. A pump (P) 54 and a flow rate adjusting valve (V) 55 are disposed at some midpoint of the pipe line 52, and a flow rate sensor (S) 56 is disposed between the flow rate adjusting valve 55 and the nozzle 53. A displacement type pump may be used as the pump 53, and the discharge amount thereof may be variable.

57 represents a controller, and the controller 57 is supplied with the detection signal of the flow rate sensor 56 to control the flow rate adjusting valve 55 and adjust the flow rate of the fluid in the pipe line 52.

This adjustment of the flow rate is carried out so that the flow rate value detected by the flow rate sensor 56 corresponds to a desired discharge amount from the nozzle 53. The flow rate adjustment may be carried out by adjusting the discharge amount of the pump when the discharge amount of the pump 54 is variable (in this case, the flow rate adjustment valve 55 may be omitted), and the adjustment of the flow rate on the basis of the pump and the adjustment of the flow rate on the basis of the flow rate adjusting valve 55 may be used in combination.

The flow rate sensor 56 of this embodiment has the structure shown in FIGS. 1 to 4. Further, the flow rate sensor of this embodiment has the circuit construction shown in FIG. 5.

According to the flow rate sensor 56 of this embodiment, even when the liquid to be detected is viscous liquid having relatively high viscosity, and further even for any flow rate distribution in the radial direction on the section of the pipe line 4, the flow rate detection can be carried out accurately with sufficiently reflecting the flow rate distribution. Accordingly, even when the flow rate is relatively minute, or under the broad environmental temperature condition, the flow rate of the fluid flowing in the pipe line can be accurately measured.

According to the first embodiment of the present invention as described above, the flow rate sensor 56 is secured just at the upstream side of the connection end of the pipe line 52 to the nozzle 53 as shown in FIG. 23 (no other equipment than the pipe line exist between the flow rate sensor 56 and the nozzle 53), so that the flow rate of the fuel oil to be supplied to the nozzle 53 (that is, the fuel oil discharge amount from the nozzle 53) can be accurately detected. Accordingly, on the basis of the flow rate value of the fuel oil detected by the flow rate sensor 56, the flow rate of the fuel oil in the pipe line 52 can be adjusted at the upstream side of the flow rate sensor 56 on the basis of the instruction of the controller 57 so that the detection value is equal to a desired discharge amount. Therefore, the control operation can be stably performed for even a minute discharge amount of about 0.1 cc/minute.

In this embodiment, the flow rate sensor 56 and the nozzle 53 may be structurally unified (that is, the flow rate sensor is secured to the pipe line in the nozzle). Further, the flow rate adjusting valve 55, the flow rate sensor 56 and the nozzle 53 may be structurally unified (that is, the flow rate adjustment valve and the flow rate sensor are secured to the pipe line in the nozzle).

Figure 24:
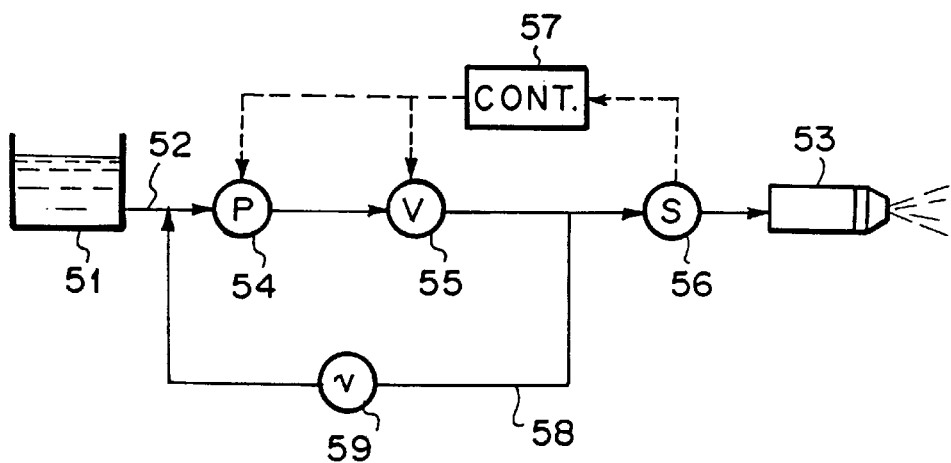
FIG. 24 is a schematic diagram showing an embodiment of the discharge amount control apparatus of the liquid discharge equipment according to the present invention.

FIG. 24 is a schematic diagram showing a second embodiment of the discharge amount control apparatus for liquid discharge equipment according to the present invention. In FIG. 24, the elements having the same functions as FIG. 23 are represented by the same reference numerals.

In this embodiment, the pipe line 52 which is the same as that of the first embodiment is provided with a return passage 58 for returning the fuel oil from the just upstream position of the flow rate sensor 56 (that is, the position between the flow rate adjusting valve 55 and the flow rate sensor 56) to the upstream position of the pump 54. A check valve (v) 59 is interposed in the return passage 58. The check valve 59 passes liquid therethrough (return the fuel oil to the upstream side of the pump 54) when the pressure difference is above a predetermined value, and it can prevent abnormal pressure increase in the pipe line 52 between the pump 54 and the flow rate sensor 56.

The minimum pressure difference for allowing the pass of the liquid through the check valve 59 may be made variable, and the value thereof may be set by the controller 57.

Of course, the same effect as the first embodiment can be achieved in this embodiment.

Figure 25:
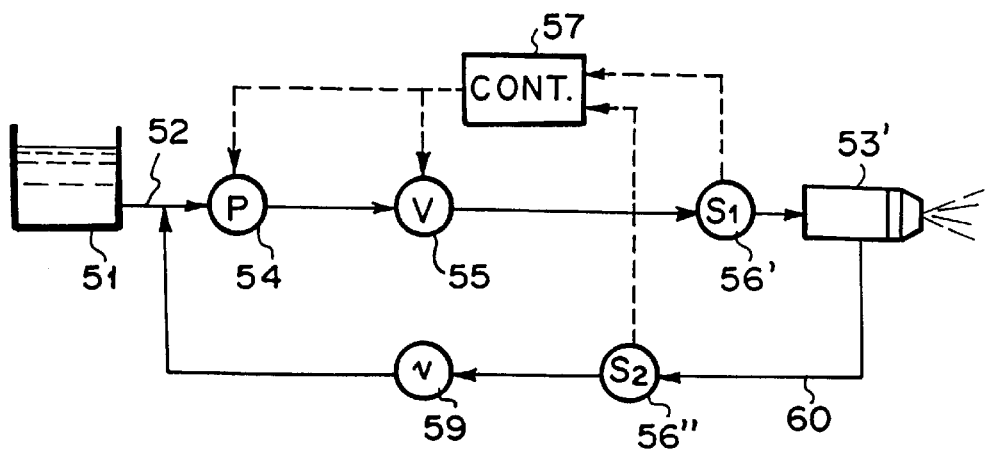
FIG. 25 is a schematic diagram showing an embodiment of the discharge amount control apparatus of the liquid discharge equipment according to the present invention.
Figure 26:
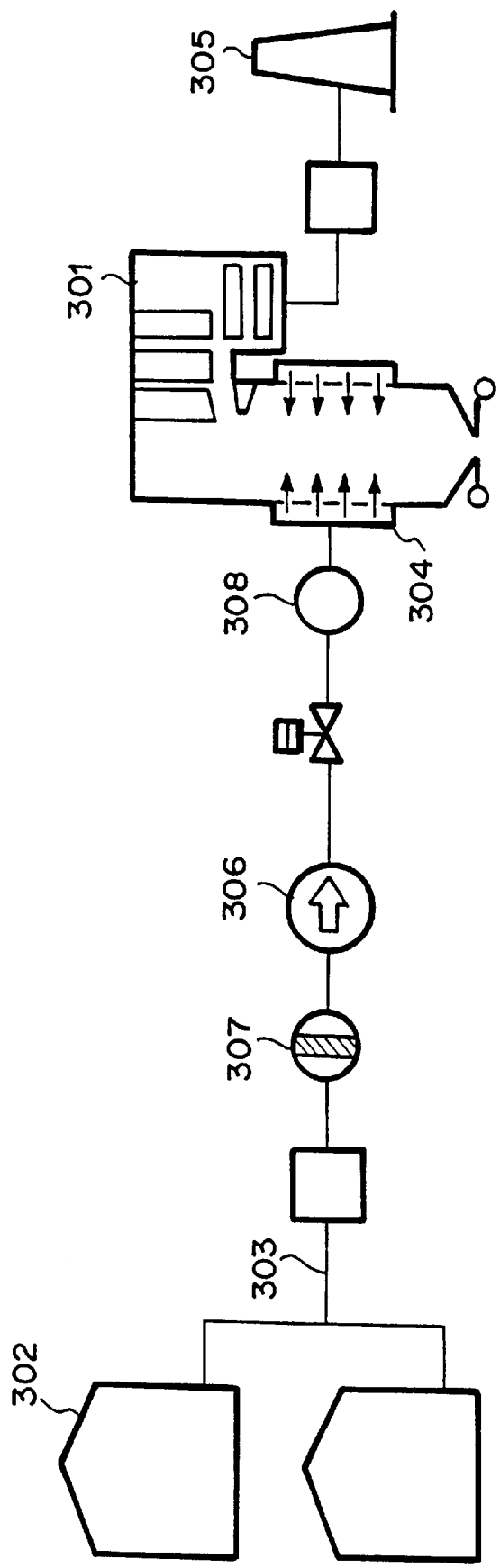
FIG. 26 is a schematic diagram showing a process of supplying kerosene from a tank, burning kerosene by a burner and discharging combusted gas from a chimney.
Figure 27A:
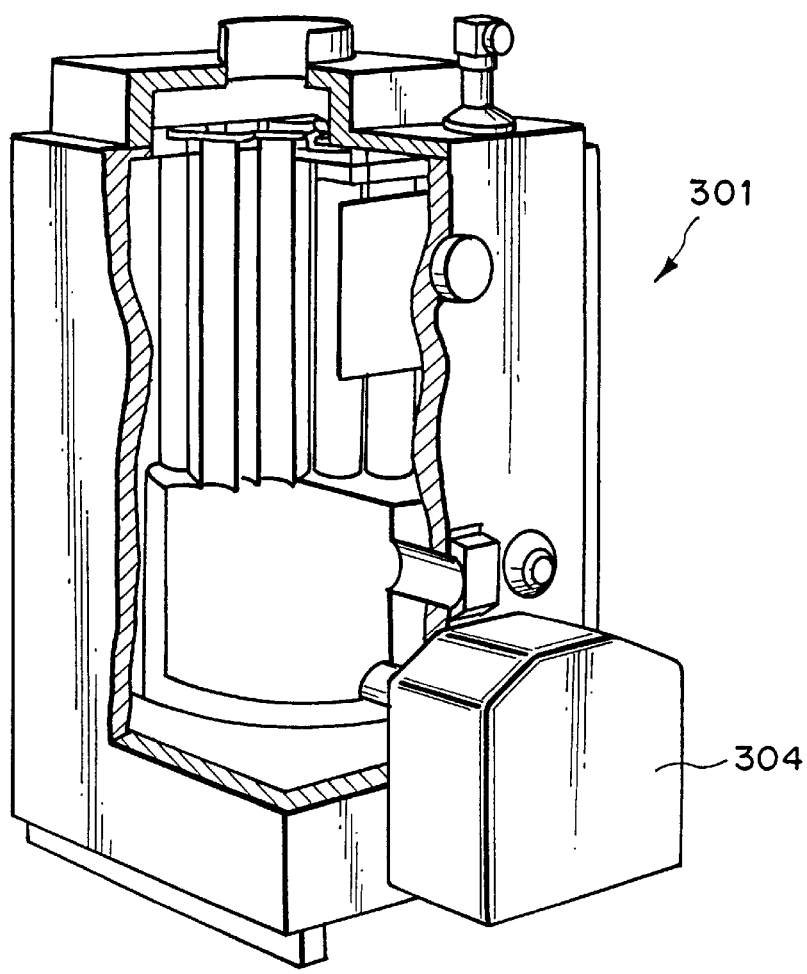
FIG. 27A is a partially cut-out perspective view of a boiler.
Figure 27B:
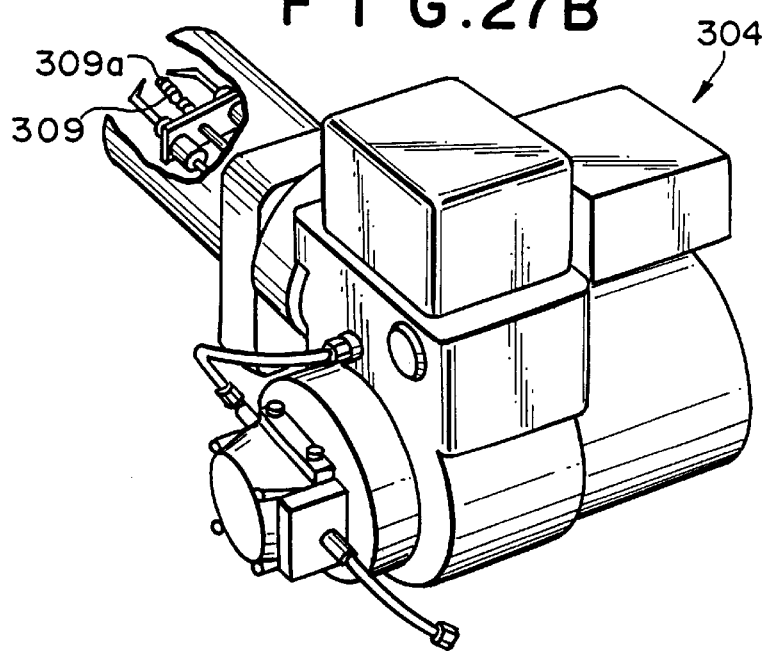
FIG. 27B is a partially cut-out perspective view of a burner.

FIG. 25 is a schematic diagram showing a third embodiment of the discharge amount control apparatus for liquid discharge equipment according to the present invention. In FIG. 25, the elements having the same functions as FIGS. 23 and 24 are represented by the same reference numerals.

In this embodiment, a return nozzle is used as the liquid discharge equipment, and fuel oil such as kerosene or the like is used as the liquid to be supplied to and discharged from the nozzle.

In this embodiment, the pipe line 52 is connected to the fuel oil supply end of a return nozzle 53'. The nozzle 53' constitutes a return type hydraulic oil burner having an air supply nozzle, ignition means, etc. A first flow rate sensor (Si) 56' is secured to the pipe line 52 between the flow rate adjusting valve 55 and the nozzle 53'.

Further, one end of a return pipe 60 is connected to the fuel oil return end of the return type nozzle 53', and the other end of the return pipe 60 is connected to the pipe line 52 at the upstream side of the pump 54. A second flow rate sensor ($S_2$) 56" is secured to the return pipe 60. Further, a check valve 59 is interposed in the return pipe 60.

The same type flow rate sensor 56 as the first and second embodiments may be used as the first flow rate sensor 56' and the second flow rate sensor 56".

In this embodiment, the controller 57 is supplied with the detection signal of the first flow rate sensor 56' and the detection signal of the second flow rate sensor 56" to control the flow rate adjusting valve 55. The adjustment of the flow rate is carried out so that the value obtained by subtracting the second flow rate value detected by the second flow rate sensor 56" from the first flow rate value detected by the first flow rate sensor 56' is equal to the value corresponding to a desired discharge amount from the nozzle.

As in the case of the first and second embodiments, the flow rate adjustment may be carried out by adjusting the discharge amount of the pump when the discharge amount of the pump 54 is variable (in this case, the flow rate adjusting valve 55 may be omitted), and the flow rate adjustment based on the pump and the flow rate adjustment based on the flow rate adjusting valve 55 may be used in combination.

In this embodiment, the first flow rate sensor 56', the second flow rate sensor 56" and the nozzle 53' may be structurally unified (that is, the first and second flow rate sensors are secured to the fuel oil supply pipe 25 line and the fuel oil return pipe line in the nozzle respectively). Further, the flow rate adjusting valve 55, the check valve 59', the first and second flow rate sensors 56', 56" and the nozzle 53' may be structurally unified (that is, the flow rate adjusting valve, the check valve and the first and second flow rate sensors are secured to the pipe line in the nozzle).

In this embodiment, the same effect as the first embodiment can be achieved.

In the above-described embodiments, means for suppressing the pulsation of the fuel oil flow rate may be interposed at a proper place of the pipe line 52.

In the above-described embodiments, the liquid is fuel oil, and the liquid discharge equipment is a non return type or return type hydraulic oil burner. However, the present invention is not limited to these embodiments, and the present invention may be applied to liquid discharge equipment which discharges various medical fluid other than the fuel oil while spraying the liquid or while not spraying the liquid.

INDUSTRIAL UTILITY

As described above, according to the flow rate sensor of the present invention, the flow rate of fluid flowing in the pipe can be accurately measured even when the fluid is viscous fluid having relatively high viscosity. Further, according to the present invention, the flow rate of fluid flowing in the pipe can be also accurately measured even when the flow rate is relatively low. Still further, according to the present invention, the flow rate of the fluid flowing in the pipe can be accurately measured under the broad environmental temperature condition.

According to the flow rate sensor of the present invention, irrespective of the flow rate of the fluid to be detected, the temperature of the flow rate detection temperature sensing element around the heating element can be kept to a substantially fixed value, so that the time degradation of the flow sensor can be suppressed and occurrence of ignition and explosion of inflammable fluid to be detected can be prevented.

Further, according to the flowmeter of the present invention, by using the pulse signal for the flow rate measurement, the flow rate measurement can be performed over a broad flow rate range with high precision without complicating the structure of the measuring portion, with reducing the frequency of occurrence of troubles of the measuring portion and without increasing the number of flow rate sensors.

Still further, the portable flowmeter of the present invention can be simply mounted on the pipe through which kerosene is supplied to a kerosene burning apparatus, and the flow rate of kerosene can be instantaneously measured. Therefore, a worker can quickly judges whether foreign matter invades into the nozzle of the burner and the discharge port is partially closed, and also immediately carry out a work for removing the foreign matter from the nozzle. Besides, incomplete combustion can be prevented to prevent waste of possession energy of kerosene and atmospheric pollution due to incompletely combusted gas. In addition, the inherent performance of the burner can be exhibited, and the heating value can be restored to a normal value.

The portable flowmeter of the present invention is simple in construction and light in weight, so that the worker can easily carry it, and quickly mount it on the pipe for supplying kerosene to the kerosene burning apparatus. Therefore, the portable flowmeter of the present invention is extremely advantageous in practical use.

Further, according to the liquid discharge amount control apparatus of the present invention, the amount of liquid which is actually discharged from liquid discharge equipment can be detected remarkably accurately, and a desired discharge amount can be obtained on the basis of the detection result.

Further, according to the liquid discharge amount control apparatus of the present invention, when the discharge amount is controlled, the flow rate can be accurately detected with high responsibility even when the fluid is viscous fluid having relatively high viscosity, even when the discharge amount is relatively small and under a broad environmental temperature condition, whereby the feedback control can be performed with high reliability and a desired discharge amount can be achieved.

What is claimed is:

1. A flow rate sensor comprising:
   a flow rate detector having a heating function and a temperature sensing function;
   a pipe line for fluid to be detected which is formed so that heat from said flow rate detector is transferred to and absorbed by the fluid, wherein the temperature sensing which is affected by a heat absorption effect of the fluid due to the heat is executed in said flow rate detector, and the flow rate of the fluid in said pipe line is detected on the basis of the temperature sensing result; and
   a heat transfer member provided to said flow rate detector and extending into the inside of said pipe line in a direction about traversing a median of said pipe line, wherein said heat transfer member is formed so as to extend to at least the vicinity of the central portion on the cross-section of said pipe line;
   wherein said flow rate detector is located outside said pipe line, and the dimension of said heat transfer member in the direction of fluid flow in said pipe line is larger than the dimension of said heat transfer member in a direction perpendicular to the extending direction of said heat transfer member on the cross-section of said pipe line and perpendicular to the direction of fluid flow in said pipe line.

2. The flow rate sensor as claimed in claim 1, wherein said flow rate detector comprises a thin-film heating element and a flow rate detecting thin-film temperature sensing element disposed so as to be affected by the effect of the heating of said thin-film heating element, said thin-film heating element and a flow rate detecting thin-film temperature sensing element being formed on a substrate.

3. The flow rate sensor as claimed in claim 2, wherein said heat transfer member is joined to said substrate.

4. The flow rate sensor as claimed in claim 2, wherein said thin-film heating element and said flow rate detection thin-film temperature sensing element are laminated on a first surface of said substrate through an insulating layer.

5. The flow rate sensor as claimed in claim 4, wherein said heat transfer member is joined to a second surface of said substrate.

6. The flow rate sensor as claimed in claim 1, wherein said pipe line is bent at a portion where said heat transfer member extends.

7. The flow rate sensor as claimed in claim 1, further comprising a temperature detector for detecting the temperature of the fluid in the pipe line for compensation when the flow rate of the fluid in the pipe line is detected.

8. The flow rate sensor as claimed in claim 7, wherein said temperature detector has the same temperature sensing function as said flow rate detector.

9. A flow rate sensor comprising:
   a heating element;
   a flow rate detection temperature sensing element disposed so as to be affected by an effect of heating of the heating element;
   a flow passage for fluid to be detected which is formed so that the heat from said heating element is transferred to and absorbed by the fluid, wherein the temperature sensing which is affected by an effect of heat absorption of the fluid due to the heating of said heating element is executed in said flow rate detection temperature sensing element; and
   heating control means for controlling the heating of said heating element connected to a passage for supplying power to said heating element, wherein said heating control means controls the power to be supplied to said heating element on the basis of the temperature sensing result so that the temperature sensing result is coincident with a target value, and the flow rate of the fluid is detected on the basis of the control state of said heating control means;
   wherein said flow rate detection temperature sensing element is located outside said flow passage, the heat from said heating element is transferred through a heat transfer member extending into the inside of said flow passage in a direction about traversing a median of said flow passage, and the dimension of said heat transfer member in the direction of fluid flow in said flow passage is larger than the dimension of said heat transfer member in a direction perpendicular to the direction of fluid flow in said flow passage and perpendicular to the extending direction of said heat transfer member on the cross-section of said flow passage.

10. The flow rate sensor as claimed in claim 9, wherein a bridge circuit is formed by using said flow rate detection temperature sensing element, and an output indicating the temperature sensing result is obtained from said bridge circuit, and said heating control means is controlled on the basis of the output.

11. The flow rate sensor as claimed in claim 10, wherein said bridge circuit comprises a temperature compensating temperature sensing element for compensating the temperature of the fluid.

12. The flow rate sensor as claimed in claim 9, wherein said heating control means is a variable resistor.

13. The flow rate sensor as claimed in claim 12, wherein a transistor is used as the variable resistor, and a signal based on the output indicating the temperature sensing result is used for the control input of said transistor.

14. The flow rate sensor as claimed in claim 9, wherein a voltage to be applied to said heating element is used to indicate the control state of said heating control means.

15. The flow rate sensor as claimed in claim 8, wherein the output indicating the temperature sensing result is input to said heating control means through a response setting means.

16. The flow rate sensor as claimed in claim 15, wherein said response setting means contains a differential amplifying circuit and an integrating circuit to which the output of said differential amplifying circuit is input.

17. The flow rate sensor as claimed in claim 9, wherein the output indicating the temperature sensing result is input to said heating control means through an integrating circuit.

18. The flow rate sensor as claimed in claim 17, wherein said differential amplifying circuit is connected to the pre-stage of said integrating circuit.

19. The flow rate sensor as claimed in claim 9, wherein each of said heating element and said flow rate detection temperature sensing element is formed of a thin film, and said heating element and said flow rate detection temperature sensing element are laminated on a substrate through an insulating layer.

20. A flow meter comprising:
   a heating element;
   a flow rate detection temperature sensing element disposed so as to be affected by an effect of heating of the heating element;
   a flow passage for fluid to be detected which is formed so that the heat from said heating element is transferred to and absorbed by the fluid, wherein the temperature sensing which is affected by an effect of heat absorption of the fluid due to the heating of said heating element is executed in said flow rate detection temperature sensing element; and heating control means for controlling the heating of said heating element connected to a passage for supplying power to said heating element, wherein said heating control means controls the power to be supplied to said heating element so that the temperature sensing result is coincident with a target value, said heating control means performs ON-OFF control of the power to be supplied to said heating element on the basis of a pulse signal having the frequency corresponding to the temperature sensing result, and the flow rate of the fluid is detected by measuring the frequency of the pulse signal;

wherein said flow rate detection temperature sensing element is located outside said flow passage, the heat from said heating element is transferred through a heat transfer member extending into the inside of said flow passage in a direction about traversing a median of said flow passage, and the dimension of said heat transfer member in the direction of fluid flow in said flow passage is larger than the dimension of said heat transfer member in a direction perpendicular to the direction of fluid flow in said flow passage and perpendicular to the extending direction of said heat transfer member on the cross-section of said flow passage.

21. The flowmeter as claimed in claim 20, wherein a bridge circuit is formed by using said flow rate detection temperature sensing element, an output indicating the temperature sensing result is obtained from said bridge circuit, the output is processed by a differentially amplifying circuit and an integrating circuit to obtain a voltage signal, and the voltage signal thus obtained is subjected to voltage-frequency conversion to obtain the pulse signal.

22. The flowmeter as claimed in claim 21, wherein said bridge circuit contains a temperature sensing element for temperature compensation to compensate the temperature of the fluid.

23. The flowmeter as claimed in claim 20, wherein switching means is interposed in a passage for supplying power to said heating element, and said heating control means performs the ON-OFF control by opening/closing said switching means.

24. The flowmeter as claimed in claim 23, wherein said switching means is a field effect transistor.

25. The flowmeter as claimed in claim 20, wherein a plurality of power supply passages to said heating element are provided, each power supply passage is supplied with a voltage which is different among said power supply passages, switching means is interposed in each power supply passage, and said heating control means selects one of said plural power supply passages to open/close said switching means thereof, thereby performing the ON-OFF control.

26. The flowmeter as claimed in claim 25, wherein when the frequency of the pulse signal arrives at the lower limit set value, said heating control means selects a power supply passage to which a lower voltage is applied, and when the frequency of the pulse signal arrives at the upper limit set value, said heating control means selects a power supply passage to which a higher voltage is applied.

27. The flowmeter as claimed in claim 26, wherein the selection of said power supply passage is performed by detecting a voltage signal which is obtained by processing with use of a differential amplifying circuit and an integrating circuit the output indicating the temperature sensing result obtained from a bridge circuit formed with said flow rate detection temperature sensing element.

28. The flowmeter as claimed in claim 20, wherein each of said heating element and said flow rate detection temperature sensing element is formed of thin film, and said heating element and said flow rate detection temperature sensing element are laminated on a substrate through an insulating layer.

29. A portable flow meter comprising:

a casing comprising a body portion and a lid portion, said body portion having at both end portions thereof connection portions to be. connected to external pipes and containing a flow pipe line penetrating therethrough;

a flow rate sensor which is accommodated in said casing and detects the flow rate of the fluid;

a display portion for displaying a flow rate value;

an operating portion for power-supplying and measuring the flow rate; and an electrical circuit for displaying on said display portion the flow rate detected by said flow rate sensor;

wherein said flow rate sensor includes a flow rate detector having a heating element and a temperature sensing element formed on a substrate, a fin plate for transferring heat to fluid to be detected therethrough, and an output terminal for outputting the voltage value corresponding to the flow rate, wherein said flow rate detector, a part of said fin plate and a part of said output terminal are coated by molding;

wherein said flow rate detector is located outside said flow pipe line, said fin plate extends into the inside of said flow pipe line in a direction about traversing a median of said flow pipe line and the dimension of said fin plate in the direction of fluid flow in said flow pipe line is larger than the dimension of said fin plate in a direction perpendicular to the direction of fluid flow in said flow pipe line and perpendicular to the extending direction of said fin plate on the cross-section of said flow pipe line.

30. The portable flowmeter as claimed in claim 29, further comprising a temperature sensor for detecting the temperature of the fluid accommodated in said casing.

31. The portable flowmeter as claimed in claim 30, wherein said temperature sensor includes a temperature detection portion having a temperature sensing element formed on a substrate, a fin plate for transferring heat to the fluid therethrough, and an output terminal for outputting the voltage value corresponding to the temperature, wherein said temperature detection portion, a part of said fin plate and a part of said output terminal are coated by molding.

32. The portable flowmeter as claimed in claim 29, wherein said display portion is disposed on the upper surface of said lid portion of said casing.

33. The portable flowmeter as claimed in claim 29, wherein said display portion digitally displays the measurement value of the flow rate.

34. The portable flowmeter as claimed in claim 29, wherein said operating portion is disposed on the upper surface of said lid portion of said casing.

35. The portable flowmeter as claimed in any one of claims 29 to 38, wherein said operating portion comprises a power source button and a measurement button.

36. The portable flowmeter as claimed in claim 29, wherein said electrical circuit has a bridge circuit which contains said temperature sensing element of said flow rate sensor and said temperature sensing element of said temperature sensor and outputs the voltage difference corresponding to the flow rate of the fluid.

37. The portable flowmeter as claimed in claim 36, wherein said electrical circuit includes a V/F conversion circuit for converting the voltage difference corresponding to the flow rate of the fluid to a pulse signal having the corresponding frequency, a counter for counting the pulse signal, and a microcomputer for converting the frequency to the corresponding flow rate.

38. The portable flowmeter as claimed in claim 29, wherein said portable flowmeter is mounted on a bypass pipe line secured to an external pipe.

39. The portable flowmeter as claimed in claim 29, wherein said portable flowmeter is mounted on a self seal coupling secured to an external pipe.

40. A liquid discharge amount control apparatus for discharging a desired discharge amount of liquid from liquid discharge equipment for discharging to the outside the liquid supplied through a pipe line connected to a liquid supply source by a pump, comprising:
a flow rate sensor for detecting the flow rate of the liquid flowing in said pipe line between said pump and said liquid discharge equipment;
flow rate adjusting means for adjusting the flow rate of the liquid in said pipe line at the upstream side of said flow rate sensor; and
a controller for controlling said flow rate adjusting means so that the flow rate value detected by said flow rate sensor is equal to the value corresponding to the desired discharge amount;
wherein said flow rate sensor comprises:
a flow rate detector having a heating function and a temperature sensing function;
a flow passage which is in communication with said pipe line and formed so that heat from said flow rate detector is transferred to and absorbed by the liquid; and
a heat transfer member provided to said flow rate detector and extending into the inside of said flow passage, wherein said heat transfer member extends to at least the vicinity of the central portion of a cross-section of said flow passage in a direction about traversing a median of said flow passage;
wherein said flow rate detector is located outside said flow passage, and the dimension of said heat transfer member in the direction of liquid flow in said flow passage is larger than the dimension of said heat transfer member in a direction perpendicular to the direction of liquid flow in said flow passage and perpendicular to the extending direction of said heat transfer member on the cross-section of said flow-passage.

41. The discharge amount control apparatus for liquid discharge equipment as claimed in claim 40, wherein said flow rate adjusting means comprises a flow rate adjusting valve secured to said pipe line between said pump and said flow rate sensor and/or said pump which is designed so that the discharge amount thereof is variable.

42. The discharge amount control apparatus for liquid discharge equipment as claimed in claim 40, wherein the liquid is inflammable liquid, and said liquid discharge equipment is a non-return type nozzle.

43. The discharge amount control apparatus for liquid discharge equipment as claimed in claim 40, wherein the liquid is fuel oil, and said liquid discharge equipment is a non-return hydraulic oil burner.

44. The discharge amount control apparatus for liquid discharge equipment as claimed in claim 40, wherein said pipe line contains a passage for returning the liquid from a just upstream position of said flow rate sensor to an upstream position of said pump, a check valve is interposed in the passage and said check valve passes the liquid therethrough when the pressure difference between both sides with respect to the check valve is equal to a predetermined value or more.

45. The discharge amount control apparatus for liquid discharge equipment as claimed in claim 40, wherein said flow rate detector comprises a thin-film heating element and a flow-rate detection thin-film temperature sensing element disposed so as to be affected by the effect of the heating of said thin-film heating element, said thin-film heating element and said flow-rate detection thin-film temperature sensing element being formed on a substrate.

46. The discharge amount control apparatus for liquid discharge equipment as claimed in claim 45, wherein said heat transfer member is joined to said substrate.

47. The discharge amount control apparatus for liquid discharge equipment as claimed in claim 45, wherein said thin-film heating element and said flow-rate detection thin-film temperature sensing element are laminated on a first surface of said substrate through an insulating layer.

48. The discharge amount control apparatus for liquid discharge equipment as claimed in claim 47, wherein said heat transfer member is joined to a second surface of said substrate.

49. The discharge amount control apparatus for liquid discharge equipment as claimed in claim 40, further comprising a temperature detection portion for detecting the temperature of the liquid in said pipe line for compensation when the flow rate of the liquid in said pipe line is detected.

50. The discharge amount control apparatus for liquid discharge equipment as claimed in claim 49, wherein said temperature detection portion has the same temperature sensing function as said flow rate detector.

51. The discharge amount control apparatus for liquid discharge equipment as claimed in claim 50, wherein said pump is a displacement type pump.

52. A liquid discharge amount control apparatus for discharging a desired discharge amount of liquid from liquid discharge equipment for discharging to the outside a part of the liquid supplied through a pipe line connected to a liquid supply source by a pump and returning the other part of the liquid through a return pipe to the pipe line, comprising:
a first flow rate sensor for detecting the flow rate of the liquid flowing in said pipe line between said pump and said liquid discharge equipment;
a second flow rate sensor for detecting the flow rate of the liquid returned through said return pipe;
flow rate adjusting means for adjusting the flow rate of the liquid flowing in said pipe line at the upstream side of the first flow rate sensor; and
a controller for controlling said flow rate adjusting means so that the value obtained by subtracting a second flow rate value detected by said second flow rate sensor from a first flow rate value detected by said first flow rate sensor is equal to a value corresponding to the desire discharge amount;
wherein said first and second flow rate sensors each comprises:
a flow rate detector having a heating function and a temperature sensing function;
a flow passage which is in communication with said pipe line and formed so that heat from said flow rate detector is transferred to and absorbed by the liquid; and a heat transfer member provided to.said flow rate detector and extending into the inside of said flow passage, wherein said heat transfer member extends to at least the vicinity of the central portion of a cross-section of said flow passage in a direction about traversing a median of said flow passage;

wherein said flow rate detector is located outside said flow passage, and the dimension of said heat transfer member in the direction of liquid flow in said flow passage is larger than the dimension of said heat transfer member in a direction perpendicular to the direction of liquid flow in said flow passage and perpendicular to the extending direction of said heat transfer member on the cross-section of said flow passage.

53. The discharge amount control apparatus for liquid discharge equipment as claimed in claim 52, wherein said flow rate adjusting means comprises a flow rate adjusting valve secured in said pipe line between said pump and said first flow rate sensor and/or said pump which is designed so that the discharge amount is variable.

54. The discharge amount control apparatus for liquid discharge equipment as claimed in claim 52, wherein the liquid is formed of inflammable liquid, and said liquid discharge equipment is a return type nozzle.

55. The discharge amount control apparatus for liquid discharge equipment as claimed in claim 52, wherein the liquid is fuel oil, and said liquid discharge equipment is a return type hydraulic oil burner.

* * * * *

UNITED STATES PATENT AND TRADEMARK OFFICE
CERTIFICATE OF CORRECTION

PATENT NO. : 6,647,777 B1  Page 1 of 1
DATED : November 18, 2003
INVENTOR(S) : Kotaka et al.

It is certified that error appears in the above-identified patent and that said Letters Patent is hereby corrected as shown below:

<u>Column 32,</u>
Line 63 and 64, delete "any one of claims 29 to 38" and substitute therefor
-- claim 32 --.

<u>Column 35,</u>
Line 1, between "to" and "said" delete ".".

Signed and Sealed this

Eighth Day of June, 2004

JON W. DUDAS
*Acting Director of the United States Patent and Trademark Office*